(12) United States Patent
Lowrance et al.

(10) Patent No.: US 9,704,128 B2
(45) Date of Patent: Jul. 11, 2017

(54) METHOD AND APPARATUS FOR ITERATIVE COMPUTER-MEDIATED COLLABORATIVE SYNTHESIS AND ANALYSIS

(75) Inventors: John D. Lowrance, Foster City, CA (US); Thomas A. Boyce, Los Gatos, CA (US)

(73) Assignee: SRI International, Menlo Park, CA (US)

( * ) Notice: Subject to any disclaimer, the term of this patent is extended or adjusted under 35 U.S.C. 154(b) by 2003 days.

(21) Appl. No.: 11/672,930

(22) Filed: Feb. 8, 2007

(65) Prior Publication Data
US 2007/0226296 A1    Sep. 27, 2007

Related U.S. Application Data

(63) Continuation-in-part of application No. 10/874,806, filed on Jun. 23, 2004, now abandoned, and a continuation-in-part of application No. 09/839,697, filed on Apr. 20, 2001, now Pat. No. 8,438,054.

(60) Provisional application No. 60/482,071, filed on Jun. 23, 2003, provisional application No. 60/232,186, filed on Sep. 12, 2000, provisional application No. 60/772,438, filed on Feb. 9, 2006.

(51) Int. Cl.
*G06F 3/00* (2006.01)
*G06Q 10/10* (2012.01)

(52) U.S. Cl.
CPC .................... *G06Q 10/10* (2013.01)

(58) Field of Classification Search
CPC ...................................... G06Q 10/10

USPC .......................................................... 715/751
See application file for complete search history.

(56) References Cited

U.S. PATENT DOCUMENTS

| 5,406,477 | A |   | 4/1995  | Harhen         |       |
|-----------|---|---|---------|----------------|-------|
| 5,461,699 | A |   | 10/1995 | Arbabi et al.  |       |
| 5,819,248 | A |   | 10/1998 | Kegan          |       |
| 5,953,707 | A |   | 9/1999  | Huang et al.   |       |
| 6,098,034 | A | * | 8/2000  | Razin et al.   | 704/9 |

(Continued)

OTHER PUBLICATIONS

Wong, Stephen T.C., "Preference-Based Decision Making for Cooperative Knowledge-Based Systems", ACM Transactions on Information Systems, vol. 12, No. 4, Oct. 1994, pp. 407-435.

(Continued)

*Primary Examiner* — Sujay Koneru
(74) *Attorney, Agent, or Firm* — Kilpatrick Townsend & Stockton LLP

(57) ABSTRACT

A method and apparatus for iterative computer-mediated collaborative synthesis and analysis synthesizes a first focus topic in accordance with ideas collected from a plurality of cooperating users. The first focus topic triggers an analysis of that focus topic. The conclusions of this analysis indicate shortcomings in the first focus topic and trigger a further synthesis of the first focus topic. The further synthesis results trigger further analysis, and so on, on an iterative basis. The cooperating users follow a process template comprises of a scripted series of synthesis and analysis activities. Facilitation support is provided to the cooperating users to assist the cooperating users in accomplishing each activity in sequence. In further embodiments, a second focus topic is synthesized in response to the conclusion implied by the analysis of the first focus topic, and an analysis of the second focus topic is triggered.

18 Claims, 25 Drawing Sheets

(56) References Cited

U.S. PATENT DOCUMENTS

| | | | |
|---|---|---|---|
| 6,098,062 | A | 8/2000 | Janssen |
| 6,192,364 | B1 | 2/2001 | Baclawski et al. |
| 6,321,225 | B1 | 11/2001 | Heckerman et al. |
| 6,405,221 | B1 | 6/2002 | Levine et al. |
| 6,606,615 | B1 | 8/2003 | Jennings et al. |
| 6,751,600 | B1 | 6/2004 | Wolin |
| 6,826,552 | B1 | 11/2004 | Grosser et al. |
| 6,938,068 | B1 * | 8/2005 | Kraft et al. ............ 709/203 |
| 2001/0032092 | A1 | 10/2001 | Calver |
| 2001/0047290 | A1 | 11/2001 | Petras et al. |
| 2001/0051913 | A1 | 12/2001 | Vashistha et al. |
| 2002/0016731 | A1 | 2/2002 | Kupersmit |
| 2002/0019825 | A1 * | 2/2002 | Smiga et al. ............ 707/102 |
| 2002/0052774 | A1 * | 5/2002 | Parker et al. ............ 705/10 |
| 2002/0188681 | A1 * | 12/2002 | Gruen et al. ............ 709/204 |
| 2003/0078766 | A1 * | 4/2003 | Appelt et al. ............ 704/9 |
| 2003/0101151 | A1 * | 5/2003 | Holland ............ 706/45 |
| 2003/0101164 | A1 * | 5/2003 | Pic et al. ............ 707/1 |
| 2003/0182168 | A1 * | 9/2003 | Lyons ............ 705/8 |
| 2003/0182310 | A1 * | 9/2003 | Charnock et al. ............ 707/104.1 |
| 2003/0227479 | A1 * | 12/2003 | Mizrahi et al. ............ 345/753 |
| 2004/0249809 | A1 * | 12/2004 | Ramani et al. ............ 707/4 |
| 2005/0005266 | A1 * | 1/2005 | Datig ............ 717/136 |
| 2005/0033807 | A1 | 2/2005 | Lowrance et al. |
| 2005/0209983 | A1 * | 9/2005 | MacPherson ............ 707/1 |
| 2010/0005081 | A1 | 1/2010 | Bennett |

OTHER PUBLICATIONS

"Introduction to Facilitate.com 8.0", www.facilitate.com/introduction.html, date unknown, printed May 25, 2004.

"Intranet: Intranets.com: Have your secure intranet up & running in minutes," www.intranets.com/, date unknown, printed Jun. 23, 2004.

"MindGenius", www.mindgenius.com/website/home.aspx, date unknown, printed Jun. 23, 2004.

"Visual Mind—Mind Mapping Software," www.visual-mind.com/download.htm, date unknown, printed Jun. 23, 2004.

"SkyMark's PathMaker software unites all the tools you need for planning, problem-solving, etc.," www.skymark.com/, date unknown, printed Jun. 23, 2004.

Wikipedia, the Free Encyclopedia, "Information theory", Wikimedia Foundation, Inc., [Retrieved from the internet on Apr. 8, 2010],< http://en.wikipedia.org/wiki/Information_theory>, Last modified Apr. 2, 2010.

Miller, George A., "WordNet, a lexical database for English, WordNet Documentation, WordNet 3.0 Reference Manual," Princeton University, <http://wordnet.princeton.edu>, 2009.

Lazaroff, Mark, "Project Genoa CrisisScope, Technical Report 1 and Recommendations of the Research", Data Item A0002, Pacific-Sierra Research, SRI International, Apr. 30, 1998.

* cited by examiner

300

New Workshop - Mozilla Firefox

New Workshop

Workshop

Facilitator                    [Browse...]
                    [Browse...] [Remove]
Participants Focus
Description Question        Do you Understand?
                                [Add] [Remove]

Answer [2]      Yes ^
                No
                        v
Default Author
Answer                  v Minimum and Maximum Number of Thoughts  [8] - [12]

Number of User Clusters        [5]
Number of Consensus Clusters   [4]
Clustering Type                Complete

[OK] [Cancel]

Angler - Unpublished Copyright 2003-2004, SRI international

Angler - Mozilla Firefox

File  Edit  View  Go  Bookmarks  Tools  Help 702a  702b  700  702c  702d  702e

Clusters                                              Number of Columns  6  ⌄    ☐ Show Description

| ☐ Cluster A | ☐ Cluster B | ☐ Cluster C | ☐ Cluster D | ☐ Cluster E |
|---|---|---|---|---|
| Non-US government agencies | User dialog, feedback, suggestion and testimonials | Archive web pages | Create a unified activity manager across SEAS and Angler | Integrate SEAS with Analyst's Notebook |
| "JavaDoc" commenting | Principles of Template Design Paper | Arguments designated as best interpretation | | Integrate SEAS with Link visualization tools |
| Accumulate a corporate memory | Provide a standard set of templates with product | Ask clients | Create pull-down menus | Integrate with major search engines |
| Action to Take Driven by Red Light | Recommend co-authors based on past performance | Ask users | Develop comprehensive SEAS API | Keep browsing area, search, tree, on left side. |
| Allow and advertise new services for SEAS | Reduce and simplify use of colors in SEAS | Automated Scripting Capability | Develop Goals for SEAS | Learn from User Community |
| Allow users to add their own header information | | Automatic Updates | Develop link to SAP | Link CIM to SEAS |
| Allow users to create MD Arg - without creating TEMP ARG | | Batched Operations | Direct dialog with SEAS users | Links to corporate decision making |
| Allow users to print SEAS args/ tmps without printing buttons | | Bayesian Networks Message Model and SEAS | Disable-assist | CONOPS |
| AML Cache | | Better support cascaded arguments | Document HTTP API | Links to HARP habitats |
| Answers in middle nodes | | Bookmarks | Documentation | Make compatible with broader array of browsers |
| Application style GUI interface for editing | | Business rule support change current model for copy/rename/delete | Evidence Source Descriptors | Make differences a formal object |
| | | Clean up long term architecture problems that make development slow | Find commercial users with same needs as US govt | Market to law enforcement |
| | | Commercial/Non-DOD gov't version | Fix the usability | Metadata |
| | | Companion book based on journal article | Fragments | Modern UI |
| | | Connect Angler to SEAS | Formalize the release process | More extensive meta data for exhibits |
| | | | Full query facility | Multiple Hypotheses Nodes |
| | | | Full text search | Multiple Security Levels at Once |
| | | | Hire marketing consultant | Multiple versions of SEAS Help System |
| | | | How to videos | |
| | | | Independant Data Storage | |

Done

Situation Descriptor for Argument IRAQ - 99

| OK | print | exit |

Perspective: I

Time Interval: 1 / 1 / 1999 and 31 / 1 / 1999 (format is dd/mm/yyyy)

Actor: I

Actor Description: I

Religion: IRAQ

Event: TRADE RELATED

Event Description: Trade sanctions invoked.

Comments and Assumptions: This is an historical analysis done after the fact.

| ☑ Component | Perspective | Actor |
|---|---|---|
| ☑ LEADERSHIP.IRAQ-99 | LEADERSHIP-AND-INTENT | |
| ☑ SOCIAL.IRAQ-99 | SOCIAL | |
| ☑ POLITICAL.IRAQ-99 | POLITICAL | |
| ☑ MILITARY.IRAQ-99 | MILITARY | |
| ☑ EXTERNAL.IRAQ-99 | EXTERNAL | |
| ☑ ECONOMIC.IRAQ-99 | ECONOMIC | |

SEAS - Unpublished Copyright 1998 - 2000, SRI International

Argument: ECONOMIC. IRAQ - 99

13-03-1999
13-03-1999

[ ◁ ] [ △ ] [ ▷ ] [ ⌂ ]   [ T ] [ ≡ ] [ ☐ ] [ ≋ ]   [ print ] [ exit ]   [ ☐ ] [ ⊟ ] [ ○ ] [ ○ ] [ ? ]

Base Question:
BUDGET CRISIS: Is a budget crisis developing or worsening?
   Consider the following:
- Rising budget deficit
- Increased external / internal borrowing
- Deteriorating foreign / short-term debt structure
- Fiscal spending is exceeding revenue collection Analyst: Seas Using Fusion Method Maximum, On, 07-11-2000 13:38:23
- ○ Very likely
- ⊛ Likely
- ⊛ Possibly
- ○ Unlikely
- ○ Very unlikely Rationale                                                           2204
[ ✎ ] Based upon historical data, there is reason to expect a budget crisis.

Documentary Evidence [ 2 ] (with [ Maximum ⬍ ] Fusion Method)

[🔍][✎][⬇]  Iraq Sanctions Case
                Analyst:   John D. Lowrance, SRI International  ○ ⊛ ○ ○ ○  ⎫
                On:        02-11-2000  10:48:13                                    ⎬ 2202a
                Relevance: In addition to Iraq's ability to finance itself                   ⎭
                             through stolen gold and durable goods, there
                             are rumors abound about large, undeclared
                             Iraqi bank accounts abroad.

[🔍][✎][⬇]  Iraq Economy 1995 Summary
                Analyst:   John D. Lowrance, SRI International  ○ ○ ⊛ ⊛ ○  ⎫
                On:        11-04-2000  14:46:09                                    ⎬ 2202b
                Relevance: Historically, Iraq has had a                            ⎭
                             very volitile economy.

TIP: to create a new Documentary Evidence, first create it as an Exhibit and then promote it.

Exhibits [ 1 ]

◀ [🔍][✎][⌹][🗑]   Iranian economic argument

TIP: to add an Exhibit, click on the In-Basket button above.

Discovery Tools [ 3 ]
    [⇦]     Gogle search for Iraq debt
    [⇦]     Exite search for Iraq debt
    [⇦]     ABC Country Book - Economy SEAS - Unpublished Copyright 1998-2000, SRI International

FIG. 22

METHOD AND APPARATUS FOR ITERATIVE COMPUTER-MEDIATED COLLABORATIVE SYNTHESIS AND ANALYSIS

CROSS REFERENCE TO RELATED APPLICATIONS

This application is a continuation-in-part of U.S. patent application Ser. No. 10/874,806, filed Jun. 23, 2004 now abandoned, which claims the benefit of U.S. Provisional Patent Application Ser. No. 60/482,071, filed Jun. 23, 2003. This application is also a continuation-in-part of U.S. patent application Ser. No. 09/839,697, filed Apr. 20, 2001 now U.S. Pat. No. 8,438,054, which claims the benefit of U.S. Provisional Patent Application No. 60/232,186, filed Sep. 12, 2000. In addition, this application claims the benefit of U.S. Provisional Patent Application Ser. No. 60/772,438, filed Feb. 9, 2006. All of these applications are herein incorporated by reference in their entireties.

REFERENCE TO GOVERNMENT FUNDING

This invention was made with Government support under Contract Number F30602-03-C-0001, awarded by the Air Force Research Laboratory and under Contract Number N66001-97-C-8551, Subcontract Number PSR-97-8551-00-SC-01, awarded by the Defense Advanced Research Projects Agency and the Office of Naval Research. The Government has certain rights in this invention.

FIELD OF THE INVENTION

The present invention relates generally to both intelligence and business processes involving iterative collaborative synthesis and analysis activities.

BACKGROUND OF THE DISCLOSURE

Both synthesis and analysis play important roles in collaborative business processes and intelligence processes. Traditionally, collaborative synthesis and analysis have been performed in a linear sequence, e.g., on an annual basis. For example, once a year, collaborative thinking applies synthesis to create a new strategy, a research and development (R&D) portfolio or scenarios of the future. Continuing with these examples, analysis is then applied throughout the year in order to fill out a strategic "scorecard", to review R&D project expenses or to monitor scenario signposts. The synthesis/analysis process then starts over the following year.

As the pace of change has accelerated, it has become increasingly clear that the results of such annual and disconnected synthesis/analysis collaborative thinking processes become rapidly outdated. As a result, significant opportunities and threats are missed. Continuous and connected synthesis/analysis iterative cycles of collaborative thinking are therefore needed in order to provide decision makers with the most up to date information. Further, computer-assisted tools are needed to make such iterative processes practical.

Thus, there is a need in the art for a method and apparatus for iterative computer-mediated collaborative synthesis and analysis.

SUMMARY OF THE INVENTION

A method and apparatus for iterative computer-mediated collaborative synthesis and analysis synthesizes a first focus topic in accordance with ideas collected from a plurality of cooperating users. The first focus topic triggers an analysis of that focus topic. The conclusions of this analysis indicate shortcomings in the first focus topic and trigger a further synthesis of the first focus topic. The further synthesis results trigger further analysis, and so on, on an iterative basis. The cooperating users follow a process template comprises of a scripted series of synthesis and analysis activities. Facilitation support is provided to the cooperating users to assist the cooperating users in accomplishing each activity in sequence. In further embodiments, a second focus topic is synthesized in response to the conclusion implied by the analysis of the first focus topic, and an analysis of the second focus topic is triggered.

BRIEF DESCRIPTION OF THE DRAWINGS

The teachings of the present invention can be readily understood by considering the following detailed description in conjunction with the accompanying drawings, in which:

FIG. 3 illustrates one embodiment of a display that the method illustrated in FIG. 2 may present to a user/moderator in order to establish parameters for a new collaborative work session;

FIG. 7 illustrates one embodiment of a display for enabling collaborative work session participants to group posted ideas into clusters;

FIG. 20 is an example of a situation descriptor viewer/editor for managing the situation descriptors that are associated with a particular argument and template;

FIG. 22 illustrates an example question having two pieces of associated documentary evidence;

To facilitate understanding, identical reference numerals have been used, where possible, to designate identical elements that are common to the figures.

DETAILED DESCRIPTION

The present invention relates to a method and apparatus for iterative computer-mediated collaborative synthesis and analysis, for example for use in business or intelligence analysis. In one embodiment, the inventive method and apparatus capture key aspects of the brainstorming and argument processes in a computer-supported cooperative work environment. Those skilled in the art will appreciate that the term "computer" may be interpreted to mean any sort of computing device, including, without limitation, a desktop computer, a laptop computer, a palm-sized computer, a personal digital assistant, a tablet computer, a cellular telephone and the like. Thus, an individual may participate in a collaborative work session structured according to the present invention using any of these devices, among others. The present invention enables users to participate in a single collaborative work session from any geographic location to privately generate, share and view ideas with others as if involved in a synchronous meeting. The invention also enables users to participate at any time in the collaborative work process, e.g., whenever inspiration strikes or whenever time is available. Participants may therefore come and go during the collaborative work session without interrupting the continuity of the process. Moreover, the present invention enables analysis of ideas generated in a collaborative brainstorming environment through the building of structured arguments. The present invention thus reduces the biases inherent in conventional analysis.

Figure 1:
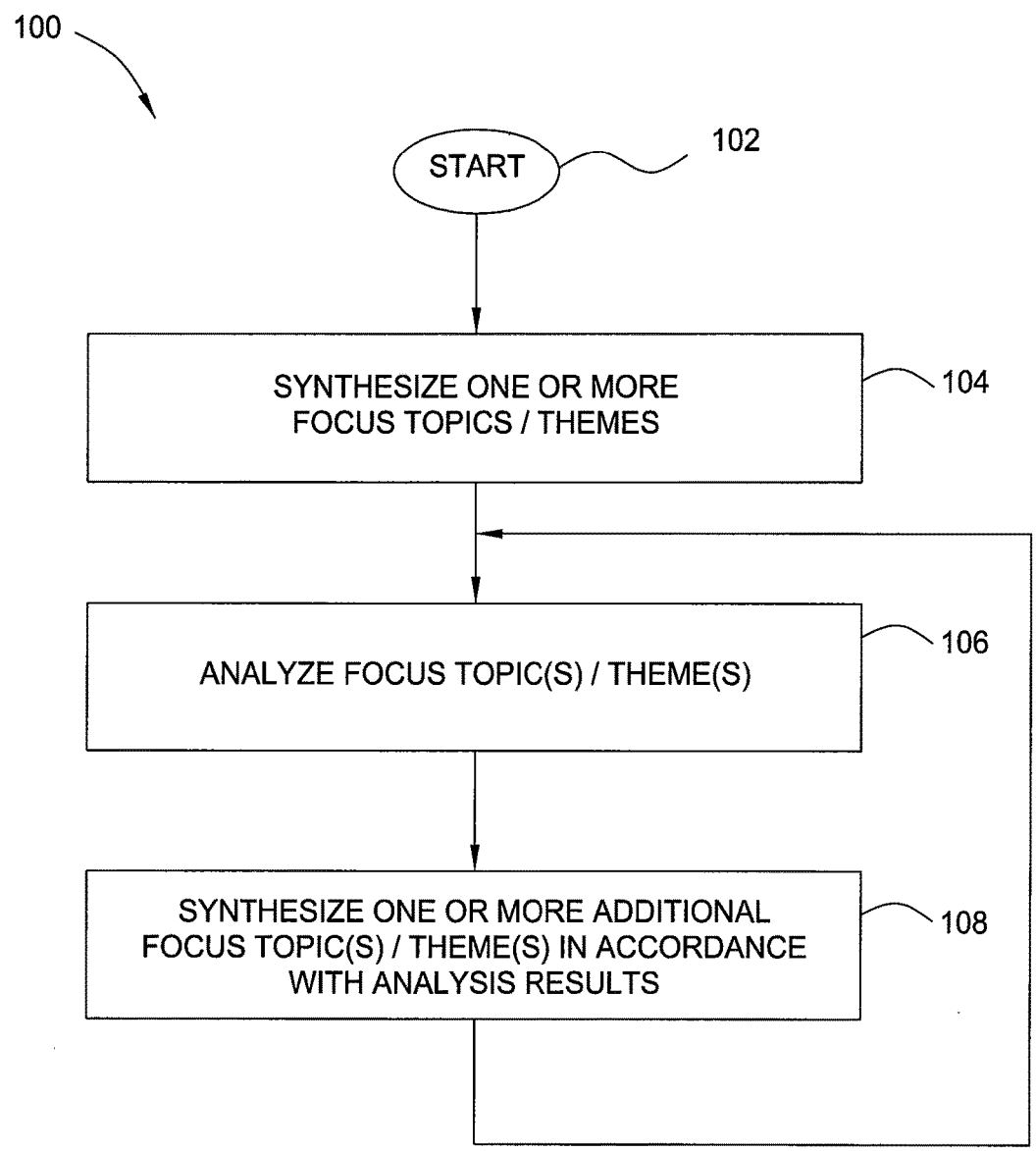
FIG. 1 is a flow diagram illustrating one embodiment of a method for iterative computer-mediated collaborative synthesis and analysis, according to the present invention.

FIG. 1 is a flow diagram illustrating one embodiment of a method 100 for iterative computer-mediated collaborative synthesis and analysis, according to the present invention. The method 100 may be implemented, for example, in a computer-mediated communication (CMC) tool.

The method 100 is initialized at step 102 and proceeds to step 104, where the method 100 synthesizes one or more focus topics/themes. In one embodiment, the focus topics/themes are synthesized through a template-guided collaborative brainstorming session involving one or more participants who contribute ideas and thoughts. For instance, in a value creation business process, template synthesis may be implemented in accordance with step 104 to develop a first iteration of new business propositions. One embodiment of a method for collaboratively synthesizing focus topics is described in greater detail with respect to FIGS. 2-10.

In step 106, the method 100 applies one or more analytical structures (e.g., structured argument templates), in accordance with the focus topic(s). In one embodiment, the analytical structures comprise structured argument templates that are triggered using the information synthesized in step 102 and completed by one or more participants. Completed templates, which comprise arguments having associated conclusions, may then be used to monitor impending situations. For instance, continuing the value creation example, analysis in accordance with step 106 may involve preparing a first iteration of structured critique of the new business propositions. Results of the analysis process (e.g., at least a conclusion) may be output or provided to a human administrator for review before proceeding further. One embodiment of a method for analysis of focus topics using templates is discussed in greater detail with respect to FIGS. 11-23.

In step 108, the method 100 uses the argument(s) formed from the structured argument template(s) developed in step 106 to motivate synthesis of further focus topics/themes, or refinement of the original focus topics/themes, before returning to step 106 applying additional analytical structures to the new (or refined) focus topics/themes. Continuing the value creation example, step 108 may involve, for instance, synthesizing a second iteration of business propositions designed at overcoming the structured critique of (the first iteration of) the analysis phase. The second iteration of business propositions then triggers a second iteration of structured critique (i.e., the return to step 106), and so on. The method 100 thus comprises an iterative process that uses CMC tools to promote structured thinking, to leverage organizational knowledge bases and to encourage cooperation among analysts, thereby greatly aiding the analysis process.

As described in further detail below, embodiments of the method 100 incorporate process templates to provide detailed descriptions of synthesis and analysis activities, as iteratively applied to group decision making processes. Such templates may be applied, for example, in business processes and national intelligence processes. For instance, in a value corporate value creation process, the method 100 could be applied to identify dynamic issues in the external environment or to create a Needs, Approach, Benefits, Competition (NABC) process (synthesis) and to track dynamic issues in the external environment or to critique NABC processes (analysis). In a plausible futures scenario, the method 100 could be applied to identify decision focus, to identify key decision factors, to identify high-impact forces, to identify axes of uncertainty, to create scenarios, to identify Strengths, Weaknesses, Opportunities, Threats (SWOT) factors or to develop policies and plans (synthesis) and to track high-impact forces, to track axes of uncertainty or to track policies and plans (analysis). In either case, the synthesis and analysis steps are iteratively repeated as necessary.

As will also be discussed in further detail below, embodiments of the method 100 asynchronously support a range of facilitation roles using humans, synthetic agents or a combination thereof. For example, the method 100 might guide cooperating users through a process template as follows: (1) Planning (e.g., objective, priority, urgency, expertise, schedule, budget); (2) Setting the stage (e.g., socialization, technology use mediation, venting thoughts and feelings); (3) Encouraging participation (e.g., drawing cooperating users out, open discussion, breakouts); (4) Creating prompts and visualizations (e.g., reminders, idea stimulators, process progress displays); (5) Resolving problems (e.g., dysfunction, mediation); and (6) Deciding (e.g., common ground, win/win, action).

Figure 2:
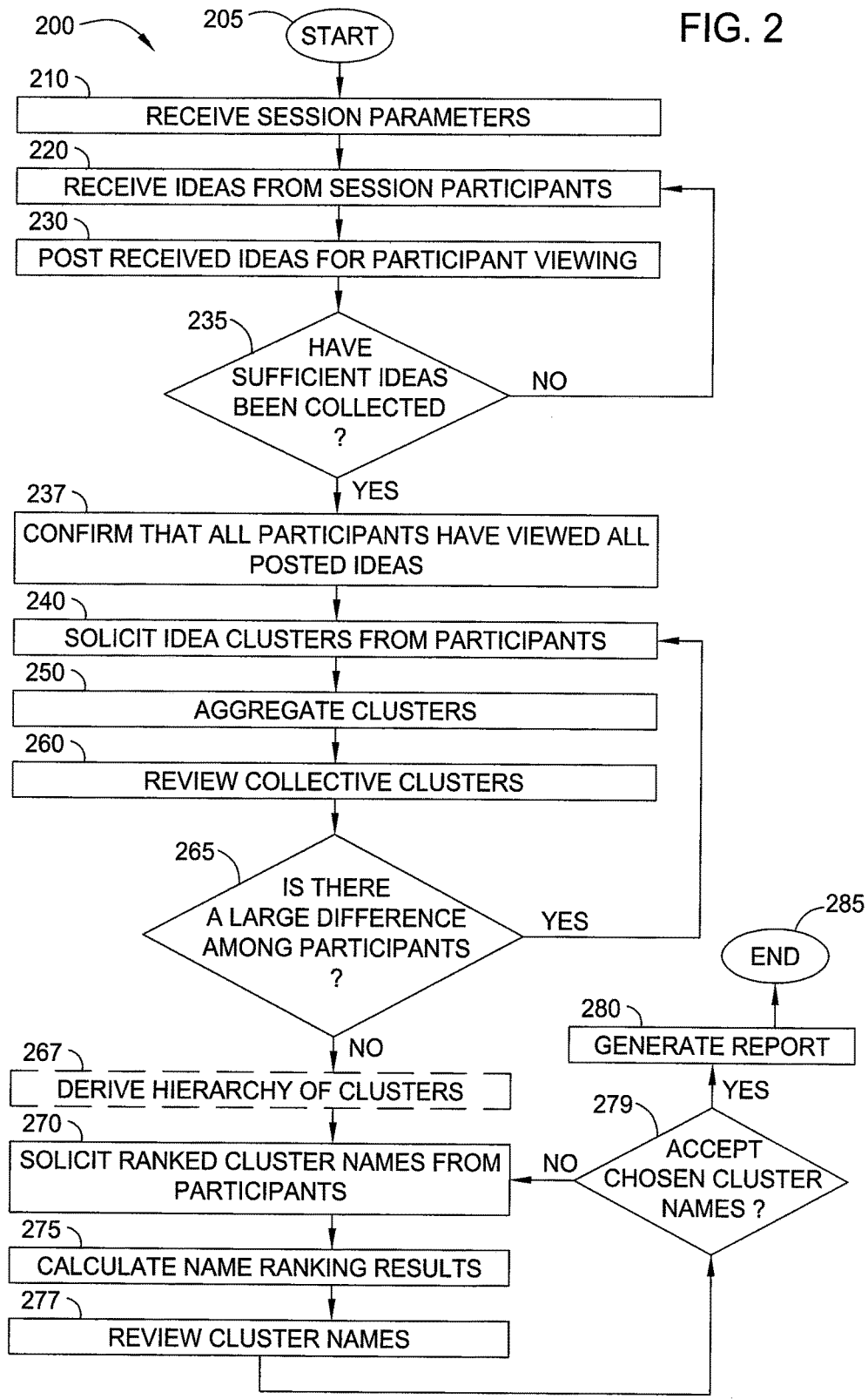
FIG. 2 illustrates a flow diagram that depicts one embodiment of a method for facilitating computer-supported collaborative work sessions, according to the present invention.

FIG. 2 illustrates a flow diagram that depicts one embodiment of a method 200 for facilitating computer-supported collaborative work sessions, according to the present invention. The method 200 may be implemented, for example, in accordance with steps 104 and 108 of the method 100 in order to synthesize focus topics/themes.

The method 200 is initialized at step 205 and proceeds to step 210, where the method 200 receives parameters for a collaborative work session (e.g., a from a user, a session moderator or a synthetic moderator). In one embodiment, adjustable session parameters include one or more of the following: the description of the need to be addressed by the session, the schedule for completing various stages of the session, whether participants should remain anonymous, how many contributions an individual participant must make before being allowed to view a specified number of contributions from others, the types of files (e.g., text files, images, etc.) that participants may contribute, the total number of ideas to be generated, a total number of idea clusters to be generated, the method to be used in finding an aggregate view, the method to be used in calculating an aggregate result from individual rankings, constraints on the activities of session participants, whether synthetic participants should be deployed and how they will perform their functions, and the like. In one embodiment, step 210 further involves receiving one or more background documents (e.g., financial performance statistics, market research, product descriptions, technical papers and the like) for distribution to session participants. Documents may be distributed any form, including, but not limited to, audio, video, text and graphic form and may be provided by any means, including, but not limited to, via web server, attachment or hyperlinks.

FIG. 3 illustrates one embodiment of a display 300 that the method 200 may present to a user/moderator in order to establish parameters for a new collaborative work session. In one embodiment, the method 200 presents a user with various adjustable parameters and options, including, but not limited to, naming the session, moderator and desired participants, designating a minimum or maximum number of ideas to be generated, questions for participants and the like, as explained in further detail below.

Figure 4:
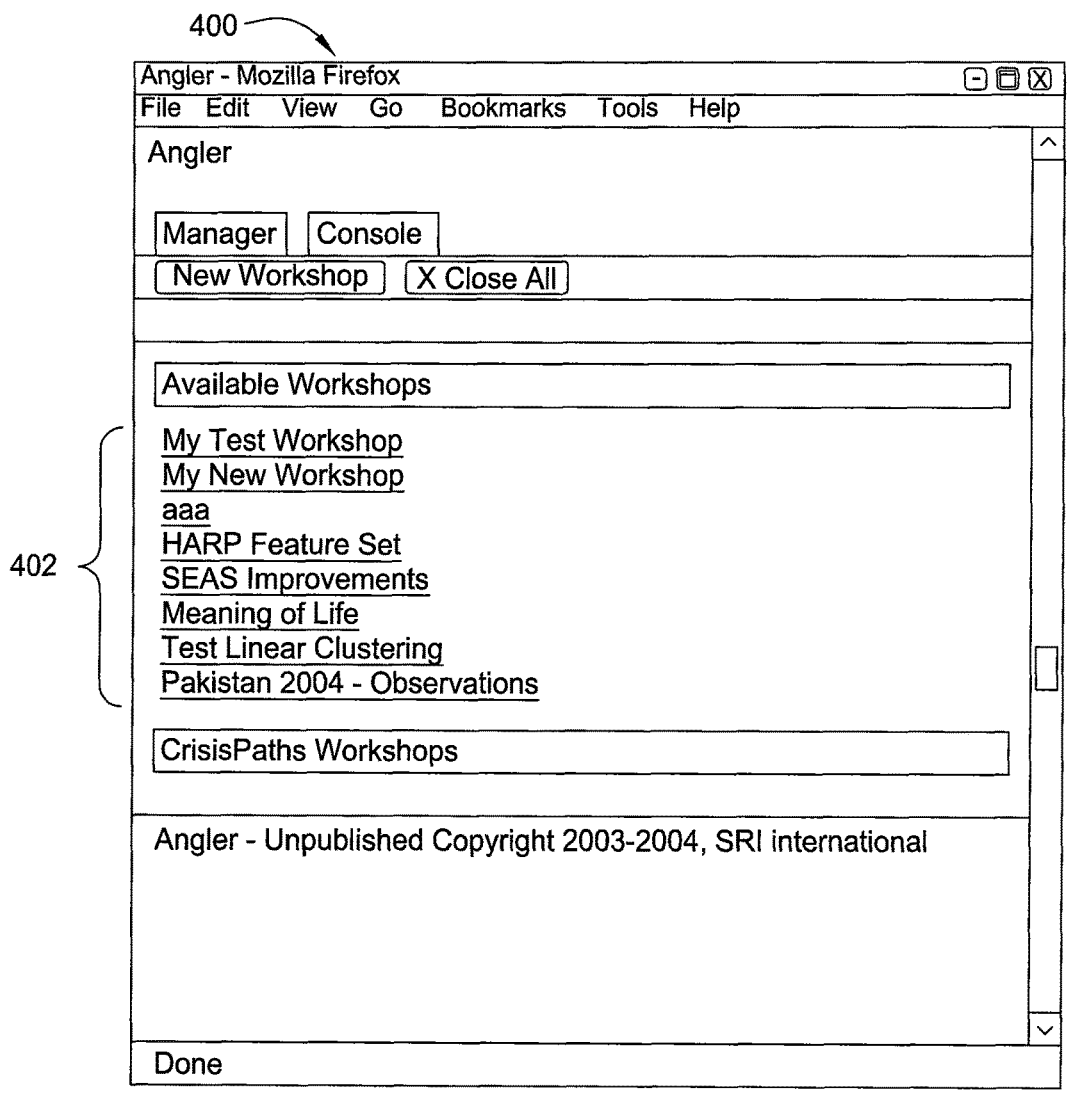
FIG. 4 illustrates one embodiment of a display that provides an interface for a user to select any one of multiple active collaborative work sessions in which to participate.

Different session parameters may be provided for a variety of different collaborative work sessions. For example, FIG. 4 illustrates one embodiment of a display 400 (e.g., for display on a user computer) that provides an interface for a user to select any one of multiple active collaborative work sessions 402 (e.g., "My Test Workshop", "My New Workshop", etc.) in which to participate. Each active session 402 may have different parameters.

In step 220, the method 200 receives ideas or questions from current session participants (e.g., participants that are, at a given time, "signed in" or actively participating in the collaborative work session). In one embodiment, ideas received by the method 200 each include a short "catch phrase" or summary of the idea's key concept, together with a more detailed explanation. In one embodiment, ideas received by the method 200 may include attachments or hyperlinks to supporting material or references. In one embodiment, the ideas are received in a manner that does not allow participants to immediately view each others' ideas, thereby allowing a participant to edit or further consider an idea submission before it is made available to the group. In one embodiment, ideas are received from session participants asynchronously (e.g., different participants contribute ideas at different times during the session).

Figure 5:
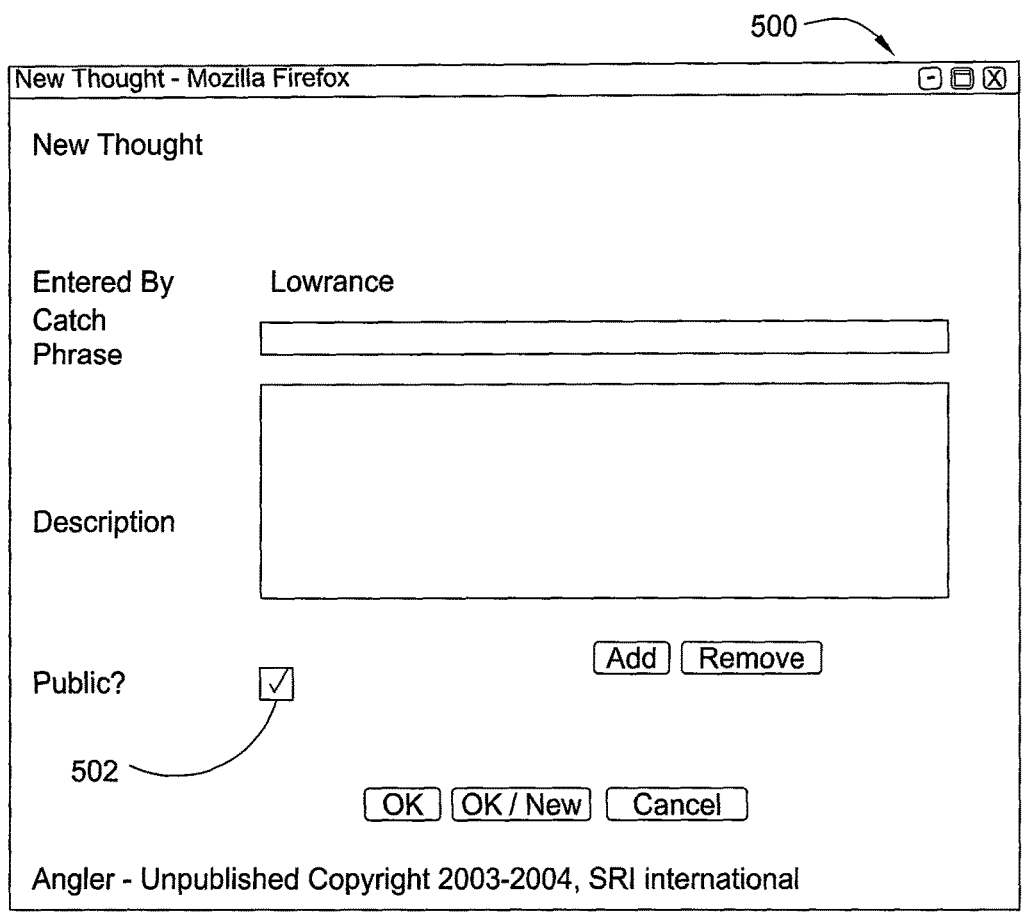
FIG. 5 illustrates one embodiment of a display that the method illustrated in FIG. 2 may present to collaborative work session participants in order to solicit ideas.

FIG. 5 illustrates one embodiment of a display 500 that the method 200 may present to session participants in order to solicit ideas. In one embodiment, the display 500 includes a checkbox 502 that enables a contributing participant to make an idea "public" by sending the idea directly to a public space and bypassing private space (e.g., for temporary storage).

In step 230, the method 200 posts the received ideas to a forum where all participants in the collaborative work session may view all submitted ideas. In one embodiment, the method 200 posts ideas in response to a user prompt indicating that a participant's idea is ready for submission or viewing. In one embodiment, the method 200 posts ideas anonymously. In another embodiment, the method 200 attributes posted ideas to the session participants who contributed the ideas. In one embodiment, ideas become incrementally available to participants once they are posted. That is, the number of ideas made visible to any particular participant may be made dependent upon the number of ideas the participant has contributed, and these parameters may be set by a user or session moderator in step 210. Thus, a contributing participant may be enabled to benefit from ideas contributed by other participants, while still being required to think for his or herself at the outset of the collaborative work session.

In one embodiment, the method 200 enables a moderator to monitor the ideas posted in step 230 and/or to contribute thoughts to brainstorming and clustering of ideas. The moderator may be a human supervisor or a computer program (e.g., a "synthetic moderator") that may operate in conjunction with "synthetic" (e.g., computer program-based) participants. In one embodiment, the synthetic moderator acts as an aid to a human facilitator; in another embodiment, the synthetic moderator replaces a human facilitator entirely.

In one embodiment, a synthetic moderator monitors for volume of idea generation over time, and, if the rate of ideas being received by the method 200 appears to be slowing, interjects (e.g., directly or via synthetic participants) high-level ideas and questions to stimulate the human participants. In one embodiment, a database of standard aspects of problem solving, which may stimulate discussion, is maintained so that the moderator can selectively or arbitrarily interject database entries. For example, database entries could include questions such as, "Have we considered the social impact?", "Will this solution scale?", "How does this relate to our competition?" and the like. In one embodiment, these aspects are provided by a user or session moderator in step 210. In other embodiments, natural language and reasoning techniques (e.g., topic spotting) are implemented to interject more specific or relevant questions.

In yet another embodiment, the synthetic moderator employs vocatives in order to address participants by name and to encourage participation (such as, "John, do you understand this thought?"). Another embodiment of a synthetic agent uses semantic indexing to contribute thoughts to the brainstorming session (relating, e.g., to existing contributions or to topics that have not yet been mentioned). Other embodiments of synthetic agents have access to various knowledge bases, allowing the synthetic agents to simulate area experts in different fields (and thereby more closely approximate a process with human participants).

In one embodiment, a synthetic moderator employs several techniques to understand ideas coming from the participants and to enhance the collaborative work process. In one embodiment, a synthetic moderator uses Natural Language Processing (NLP) technology to parse ideas and generate canonical representations of the parsed ideas. In one embodiment, the canonical representation is a tree of words that can be mapped to a lexical database, knowledgebase or system (for example, such as WordNet's® (of Princeton University's Cognitive Science Laboratory) "synsets" (syntactic sets)) for further understanding and topic mapping. In one embodiment, a synthetic moderator uses pattern recognition technology to spot analogies between a current collaborative work session and previous, saved collaborative work sessions that are stored in corporate memory. In one embodiment, if a collaborative work session is stored in the form of a graph, graph edit distance can provide a similarity metric. In another embodiment, coverage metrics are used to compare the current collaborative work session against a complete lexical graph (e.g., a WordNet® graph), in order to determine whether closely related ideas have been considered. For example, in one embodiment, a graph of the current collaborative work session is overlaid on top of a WordNet® graph.

In another embodiment, a synthetic moderator is enabled to filter duplicate ideas or to merge very closely related ideas. In one embodiment, the synthetic moderator provides feedback to individual session participants indicating when an idea that a participant has just submitted is similar to an existing idea. In one embodiment this task is automated, for example via a mapping between WordNet® synsets describing each idea. Since WordNet® synsets map words back to their original roots, two ideas may be identified as comparable even if they are expressed differently. Such functionality might also allow the synthetic moderator to identify and flag culturally-based viewpoints and "groupthink" bias by assessing thematic closeness and alignment of contributed ideas. For example, the synthetic moderator could use semantic closeness in conjunction with logical rules to identify when a participant is adjusting his or her thoughts to align with his or her view of the consensus. A similar approach, using built-in logical rules for identify known biases, could be used to identify cultural differences.

In one embodiment, synthetic participants are enabled that embody the "corporate memory" of an organization. In one embodiment, synthetic participants can access databases containing, for example, financial results, policies, white papers, briefs, prior collaborative work session results and the like. In one embodiment, a synthetic participant uses topic spotting, semantic indexing and/or other methods to identify relevant background information in a database that can be introduced into the collaborative work session. In another embodiment, a synthetic participant is enabled to respond to questions posted to the session, such as, "Will the corporate memory participant post our financial rollup for 1997?". Synthetic participants and/or moderators embodying corporate memory or knowledge bases might also leverage this knowledge to recommend potential participants for brainstorming sessions.

Figure 6:
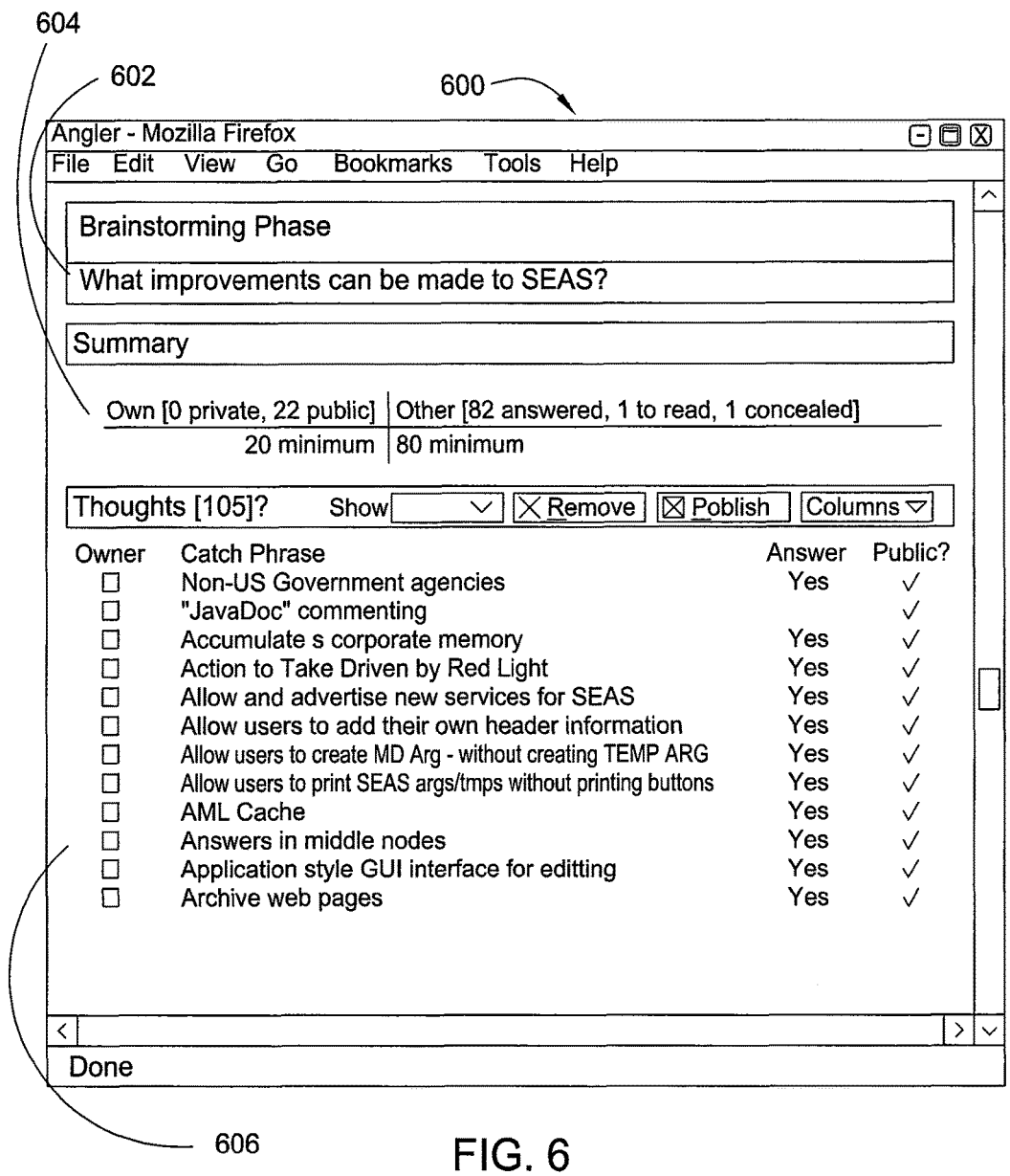
FIG. 6 illustrates one embodiment of a display that may be used to display session parameters and objectives to collaborative work session participants.

FIG. 6 illustrates one embodiment of a display 600 that may be used to display collaborative work session parameters and objectives to session participants. In one embodiment, the display 600 comprises three main areas. A first area 602 (e.g., the "Brainstorming Phase" area) indicates the focus of the current session (e.g., "What improvements can be made to SEAS?"). In one embodiment, the first area 602 is updated throughout the collaborative work session to reflect the current status of the session and/or to provide additional instructions to the session participants. A second area 604 provides a summary of the number of ideas contributed, by the user and by other session participants, to the current session. In one embodiment, the second area 604 also displays the minimum number of ideas that each participant should contribute, the number of ideas from other participants that are currently concealed, the number of ideas that have been viewed, or a combination thereof. A third area 606 lists all ideas that the user currently has access to. In one embodiment, displayed ideas are sortable.

Referring back to FIG. 2, in step 235, the method 200 determines if sufficient ideas have been collected. In one embodiment, a session parameter set by a user or session moderator in step 210 defines a threshold for the sufficiency of collected ideas. In one embodiment, the parameter defines a minimum number of total ideas to be collected and/or posted from participants, a minimum number of ideas to be collected from each individual participant, a time limit for collecting ideas, or a combination of these requirements. If the method 200 determines in step 235 that sufficient ideas have been collected, the method 200 proceeds to step 237. Alternatively, if the method 200 determines that sufficient ideas have not been collected, the method 200 returns to step 220 to receive more ideas from session participants.

In one embodiment, if sufficient ideas have not been collected, the method 200 repeats steps 220 and 230 synchronously for all current participants, so that all current participants must post a first idea or set of ideas before any individual participant is permitted to post a second idea or set of ideas. In another embodiment, the method 200 does not repeat steps 220 and 230 synchronously for all current participants, so that any number of ideas may be posted by a particular participant regardless of the number of contributions from other participants.

In step 237, the method 200 confirms that all current participants have viewed all posted ideas, including those contributed by other participants. In one embodiment, the method 200 confirms this by asking each current participant a question about each idea. For example, the question that the method 200 presents to each participant might be, "Do you understand the idea?". In one embodiment, the question and possible answers are defined in step 210. Once the method 200 has confirmed that all current participants have viewed all posted ideas, the method 200 proceeds to step 240. Alternatively, if the method 200 determines, based on the participants' answers to the question(s) in step 237, that all current participants have not viewed all posted ideas, or that further review of the posted ideas is necessary, the method 200 may repeat step 237 and ask additional questions in order to clarify or expand the posted ideas.

In step 240, the method 200 solicits participant feedback in order to group the posted ideas into clusters of related ideas, e.g., based on similarities perceived by the participants. In one embodiment, the method 200 receives two or more clusters from each individual participant, where each participant creates his or her clusters without knowledge of the other participants' perceptions. In one embodiment, the method 200 provides, for example via a graphical user interface, a table view of all of the posted ideas and fields or "buckets" into which the posted ideas may be placed to perform the clustering. In another embodiment, the method 200 provides a 2D/3D "idea landscape" that can be shaped by participants to arrive at a clustering using an incremental technique. In one embodiment, the clusters solicited from the participants in step 240 also include names for each cluster, as designated by the participants who created the clusters. In one embodiment, the names comprise overarching descriptions of the ideas in the cluster that indicate why the participant who created the cluster believed that the ideas in the cluster should be grouped together.

In one embodiment, the method 200 solicits clusters from participants by providing a similarity metric between ideas. In another embodiment, synthetic participants are enabled to provide clusters that present a certain perspective on the posted ideas, for example based on corporate memory (e.g., a semantic cluster could be generated out of a lexical database or reference system such as WordNet®).

In one embodiment, there are two types of clusters that the method 200 may receive from participants, depending on parameters defined in step 210 (e.g., by a moderator). A first type of cluster is a "strict-membership cluster", where any single idea associated with the cluster may not be associated with a second cluster. A second type of cluster is a "fuzzy cluster", where any single idea associated with the cluster may be associated with any number of other clusters.

In one embodiment, synthetic participants are deployed to semantically guide the clustering process. In one embodiment, the participants each map all of the posted ideas onto a complete lexical reference graph such as a WordNet® graph, and then calculate distance as a metric to produce clustering. That is, since a posted idea will typically be composed of several words, the distance between two ideas can be defined in a number of ways, including using similarity measures based upon distances within ontological trees as described by Mark Lazaroff and John Lowrance, "Project Genoa: Research Findings & Recommendations, Technical Report 1—Study/Services," Veridian/SRI contract deliverable on Navy Contract No. N66001-00-D-8502, delivery order number 1, Apr. 30, 2001. In one embodiment, a suitable metric is the average of the distances between each word in a first idea and all words in a second idea. Different metrics may be developed to correspond to different emphases on the data, and different synthetic participants can provide different views. In one embodiment, multiple metrics may be employed, and metrics may be selected in step 210 during the definition of session parameters.

FIG. 7 illustrates one embodiment of a display 700 for enabling session participants to group posted ideas into clusters 702a-702e. In one embodiment, the number and nature of the clusters 702a-e are defined by the individual participants. In one embodiment, a portion of the display (not shown) lists all posted ideas that have not yet been placed into a cluster by the user, and the user is enabled to drag the ideas across the display and drop the ideas into a column corresponding to a cluster 702a-702e. In one embodiment, ideas are identified on the display by their catchphrases for the purposes of clustering. In another embodiment, a user may toggle the display to show either the catchphrases or the full descriptions of the ideas. In one embodiment, the displayed clusters 702a-702e are assigned default names, such as "Cluster A", "Cluster B", etc. In another embodiment, a participant may provide names for the clusters he or she has created.

Figure 8:
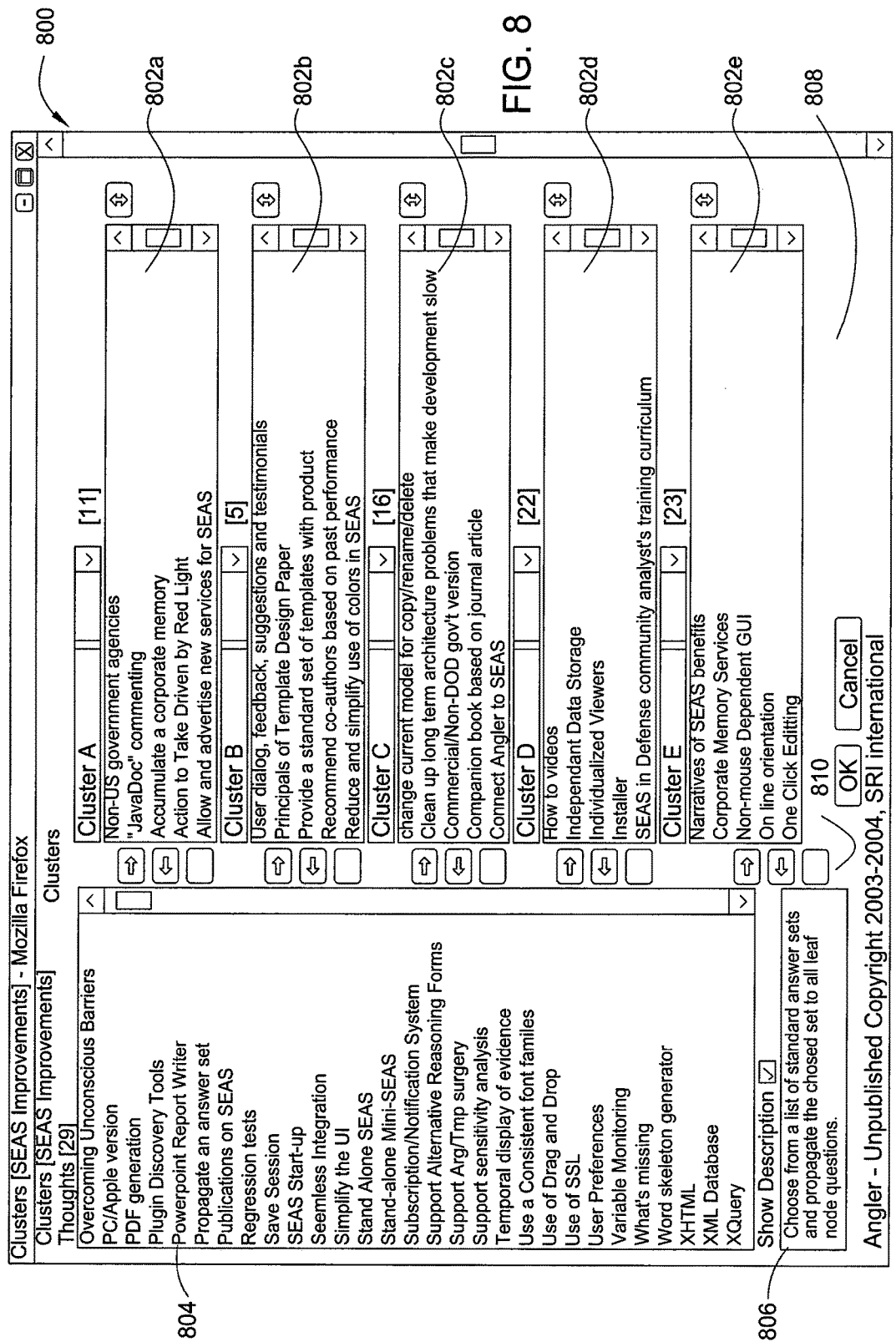
FIG. 8 illustrates another embodiment of a display for enabling session participants to group posted ideas into clusters.

FIG. 8 illustrates another embodiment of a display 800 for enabling session participants to group posted ideas into clusters 802a-802e. The display 800 is an interface that, in one embodiment, comprises three main areas. A first area 804 lists all posted ideas by their respective catchphrases. A second area 806 displays the detailed description of the idea corresponding to a catchphrase highlighted in the first area 804. A third area 808 comprises several cluster fields 802a-802e into which ideas listed in the first area 804 may be placed. In one embodiment, each cluster field 802a-802e includes a set of buttons 810 that allow a user to move ideas from the first area 804 into a respective cluster field 802a-802e, or vice versa. For example, in one embodiment, a user may click a button associated with a given cluster field 802a-802e, so that all ideas subsequently clicked automatically are moved into the selected cluster field 802a-802e. In one embodiment, all cluster fields 802a-802e that are displayed are associated with a respective color (e.g., Red, Green, etc.) and name (e.g., Cluster A, Cluster B, etc.).

Referring back to FIG. 2, in step 250, the method 200 aggregates the clusters solicited from the participants to form collective clusters. In one embodiment, a moderator defines a number of desired collective clusters. In one embodiment, aggregation of participants' clusters is performed by agglomerative clustering, using a pair-wise number of agreeing participants between two ideas as a metric. The method 100 finds a balance between closely related ideas and similar cardinalities for the participants' clusters. In one embodiment, the method 200 assigns negative scores to collective clusters that are inversely proportional to the sizes of the collective clusters (e.g., in terms of the number of ideas contained therein), in order to prevent collective clusters from becoming too large relative to other collective clusters. In other embodiments, other types of clustering techniques may be implemented in step 250, such as spectral graph clustering. In one embodiments, collective clusters generated in accordance with step 250 comprise the focus topics that are the result of the synthesis performed in steps 104 and 108 of the method 100, described above. Thus, steps 240-250 essentially merge the clusters formed by the participants.

Figure 9:
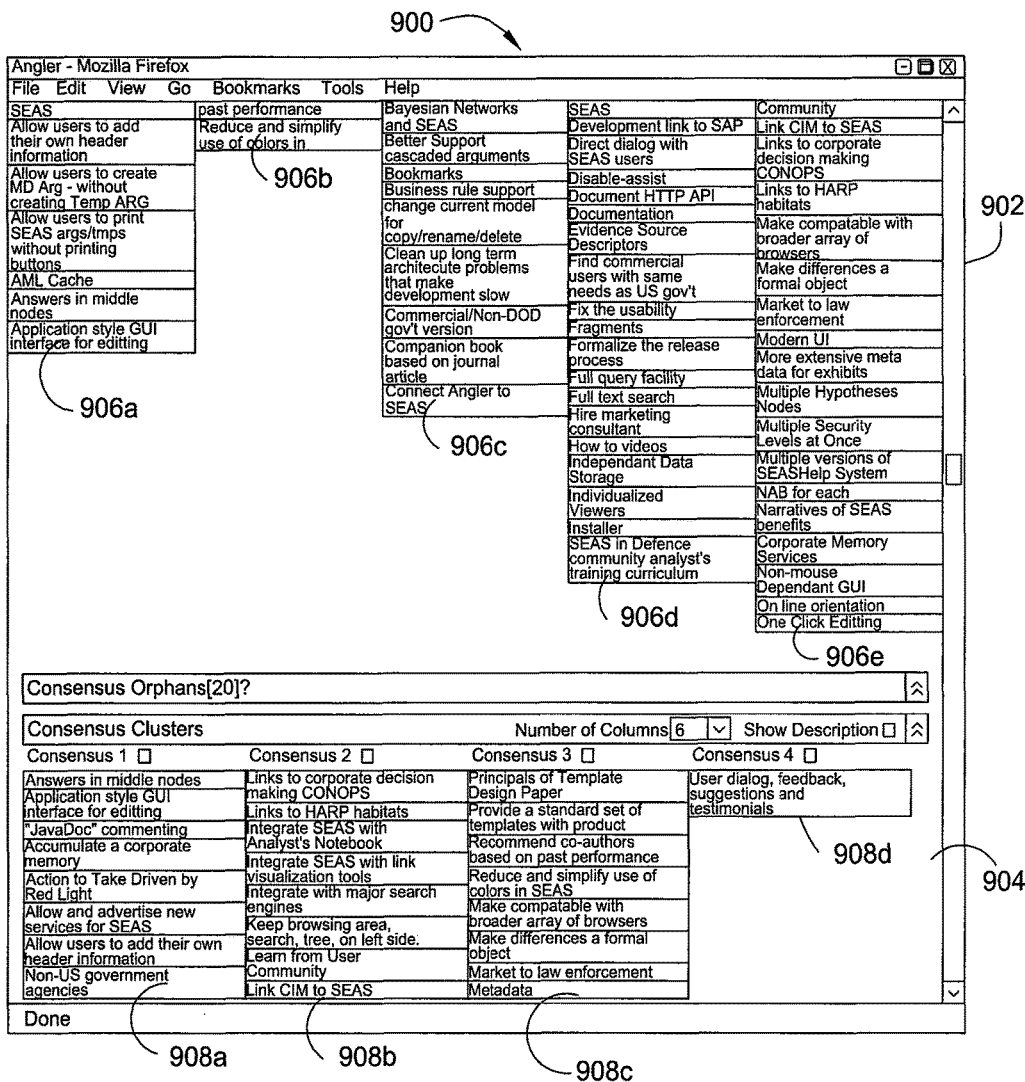
FIG. 9 illustrates one embodiment of a display for simultaneously displaying individual participant and collective clusters.

In one embodiment, the method 200 generates a display for each participant that shows that participant's own clusters relative to the collective clusters, so that the participant can see how different his or her perspective is from the group aggregation. FIG. 9 illustrates one embodiment of a display 900 for simultaneously displaying individual participant and collective clusters. In one embodiment, the display 900 comprises two main areas: a participant cluster area 902 and a collective cluster area 904. In one embodiment, the participant cluster area 902 is substantially similar to the third area 808 of the display 800, and includes several participant-generated clusters 906a-906e distinguished by color and/or name. In one embodiment, the collective cluster area 904 also comprises several collective clusters 908a-908d, distinguished by color and/or name. The number of clusters in the participant cluster area 902 and the collective cluster area 904 do not necessarily have to be equal, as many concepts proposed by participants in the initial clustering may be condensed or combined.

Referring back to FIG. 2, in step 260, the method 200 reviews the resultant collective clusters. In step 265, the method determines whether there are significant differences in the ways that the participants have clustered the posted ideas relative to the collective clusters. In one embodiment, the size of a difference that qualifies as "significant" is predefined in step 210 of the method 200. In one embodiment, the difference between clusters is calculated using Information Theory mechanisms. As defined by C. E. Shannon and W. Weaver, "The Mathematical Theory of Communication," University of Illinois Press, Urbana Ill., 1949, the entropy of the clusters (e.g., as used in the construction of decision trees) defines the amount of information. A measure known in the art as "mutual information" defines the amount of correlation between two clusters. The average of mutual information between the aggregation (i.e., collective clusters) and each individual participant's clusters can be used to quantify the difference In one embodiment, if the method 200 detects a large difference (e.g., a difference that exceeds a predefined threshold) between the individual participants' clusters, the method 200 returns to step 240 and asks the participants to provide alternative clusters.

In one embodiment, if the variation between participants' clusters is not significant, the method 200 derives a hierarchy of collective clusters in step 267. In one embodiment, aggregation of clusters in accordance with step 250 is performed using an Agglomerative Clustering technique that inherently defines a hierarchy of collective clusters (e.g., because at any moment in the aggregation process, two sub-clusters are being assembled). In this embodiment, the hierarchy resembles a dendritic tree (or dendrogram), where aggregation is refined at each step by merging two collective clusters together.

In one embodiment, if the method 200 determines, after executing steps 260-267, that the collective clusters are not adequate for the purposes of the collaborative work session, the method 200 may initiate manual review. In another embodiment, the method 200 selects the clusters assembled by one of the participants. In one embodiment, means are provided to allow all current participants to review other participants' clusters, so that they can understand how other participants have attempted to reduce the problem or issue that is the subject of the collaborative work session.

In step 270, the method 200 solicits feedback from the session participants in order to name the collective clusters formed in step 250. Each participant is asked to rank suggested names (e.g., taken from all of the participants' individual clusters submitted in step 240) for each collective cluster.

In one embodiment, the suggested collective cluster names are presented to each participant, who ranks the names in order of preference. In one embodiment, the method 200 asks participants to rank a specified number of suggested names (e.g., the top three choices).

In one embodiment, the method 200 employs a Jaccard similarity metric between two collective clusters (e.g., the cardinality of the intersection divided by the cardinality of the union) to define a percentage of similarity between the collective clusters. This approach would allow the method 200 to provide an initial ranking of the suggested collective cluster names before they are presented to the participants for active ranking, since participants' individual cluster names having higher Jaccard similarity values will be ranked more highly than those having lower similarity values. This approach also ensures that each suggested name is assigned to only one collective cluster (e.g., since it is possible to determine the collective cluster that is closest to the participant cluster from which the name came).

Figure 10:
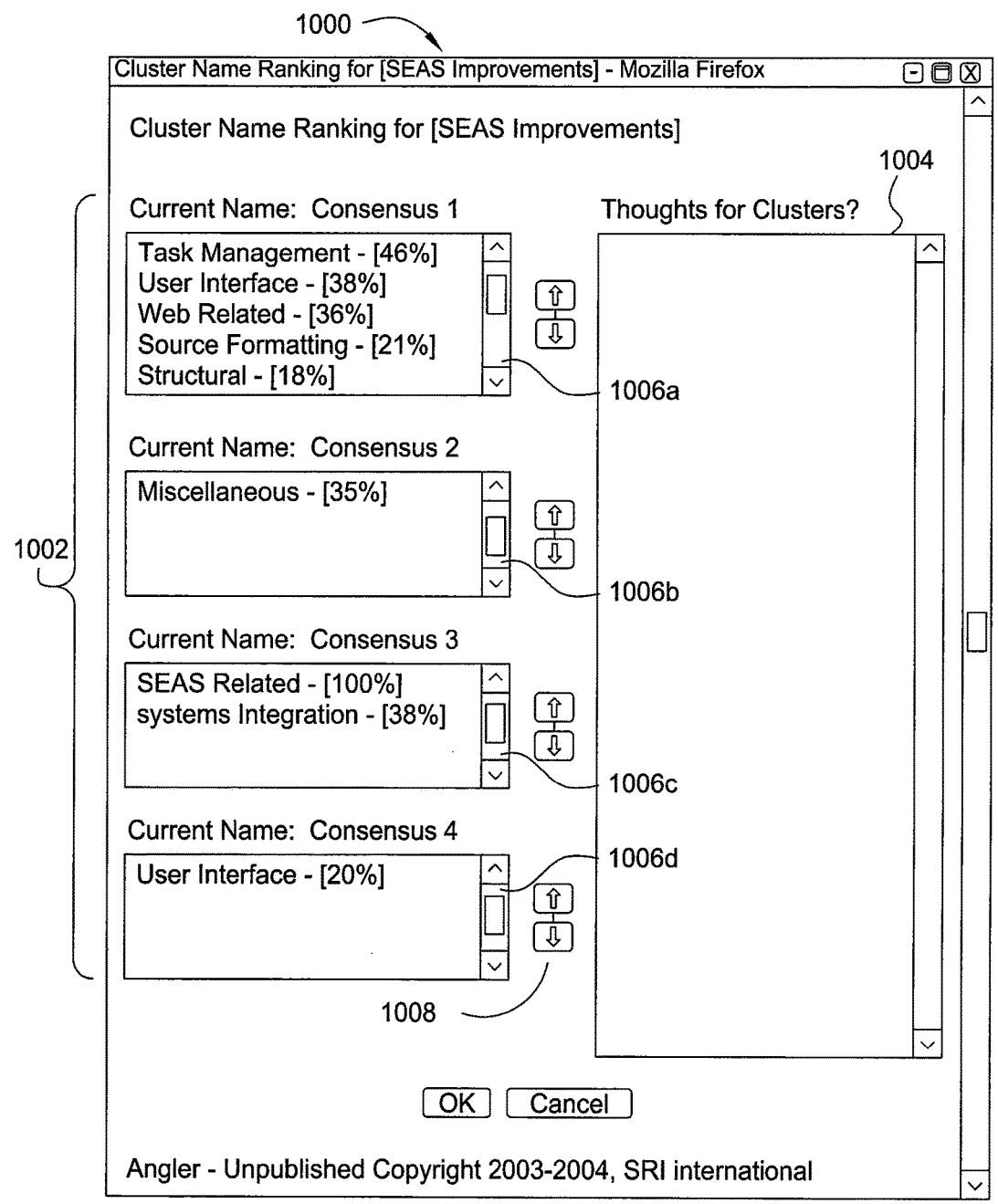
FIG. 10 illustrates one embodiment of a display for enabling participants to contribute and/or rank suggested names for collective clusters.

FIG. 10 illustrates one embodiment of a display 1000 for enabling participants to contribute and/or rank suggested names for collective clusters. In one embodiment, the display 1000 includes two main areas: a ranking area 1002 and an idea area 1004. The ranking area 1002 includes a ranking field 1006a-1006d for every collective cluster formed in step 250. Each ranking field 1006a-1006d lists the suggested names for its respective collective cluster. In one embodiment, each suggested name is associated with a percentage that represents a Jaccard similarity metric as described above. Thus, for example, if a suggested name comes from a participant cluster having an identical composition to the collective cluster (e.g., both clusters contain all of the same ideas), the suggested name would have a percentage score of 100% (e.g., because the intersection and union of the elements is exactly the same). In one embodiment, buttons 1008 associated with each ranking field 1006a-1006d allow a user to highlight a name and move it up or down in the ranking field 1006a-1006d. The idea area 1004 displays the contents of the corresponding collective cluster as the user manipulates the suggested names in the ranking field 1006a-1006d.

Referring back to FIG. 2, in step 275, the method 200 then calculates the ranking results to identify and select the collectively preferred name for each collective cluster. In one embodiment, this is achieved by assigning a number of votes to each rank placement (e.g., first placement gets 10 votes, second placement gets 5 votes, etc.), and then summing the votes for each name. In another embodiment, participants are assigned a limited number "voting points" that they can distribute in any permissible quantity (e.g., limited only by the total number voting points assigned and/or already used) among suggested names.

In step 277, the method 200 reviews the selected names for the collective clusters. The method 200 then proceeds to step 279 and determines whether to accept the chosen names for the collective clusters. In one embodiment, the method 200 grants a moderator the final say on name choices for the collective clusters. In one embodiment, the names assigned to the collective clusters through participant rankings (e.g., the most highly ranked names for each collective cluster) are assigned by default, but the moderator is enabled to override these assignments or break ties by indicating a decision in step 279.

If the method 200 determines that the chosen names are not acceptable, the method 200 returns to step 270 and re-attempts to solicit participant feedback to rank potential names. Alternatively, if the method 200 determines that the chosen names for the collective clusters are acceptable, the method 200 proceeds to step 280 and generates a report of the collective work session. In one embodiment, the report generated by the method 200 in step 280 includes the named collective clusters and/or the complete history of the process leading up to the formation of the named collective clusters. In another embodiment, the report also incorporates results or history from other collaborative work sessions. The final, named collective clusters may be considered by an organization in addressing the need under scrutiny in the collective work session.

In one embodiment, the report is an electronic report that may be, for example, emailed to an individual or stored in a database. In another embodiment, the report is automatically transferred to a Structured Evidential Argumentation System (SEAS) and converted into a SEAS template, as described in further detail below. The method 200 terminates at step 285, once the report has been generated.

As described above, a user may access a collaborative work session operating in accordance with the method 200 using a variety of computing devices. Moreover, the selected computing device may connect to the session using any one of a plurality of network protocols, including, but not limited to Hypertext Transport Protocol/Hypertext Markup Language (HTTP/HTML), Wireless Application Protocol (WAP), Extensible Markup Language/Simple Object Access Protocol (XML/SOAP) and Java® smart client, among others.

Embodiments of the method 200 for facilitating computer-supported collaborative work sessions are enhanced to encourage greater socialization and participation among collaborators. For example, in one embodiment, the method 200 provides mechanisms for greetings, vocatives (i.e., addressing participants by name), feedback provision among participants and descriptions of shared context. Specific ways in which these objectives may be accomplished include introductory exercises such as "meet and greet" sessions or sub-conferences in which users are encouraged to introduce themselves to the others and short biographies or profiles of the participants that are available to the others. In further embodiments still, new participants may be integrated more quickly into the collaborative process by partnering the new participants with more experienced participants who can provide information about, for example, group norms and expectations. Partnering of participants in this manner may also improve personal relationships among the participants.

Further embodiments of the method 200 include a mediator or facilitator to assist with the use of the technology required to support the collaborative process. For example, individuals who once traveled great distances for meetings may be somewhat apprehensive to the idea of videoconferencing or real-time chatting as a replacement for traditional face-to-face meetings.

Still further embodiments of the method 200 employ a "cathartic exercise" prior to brainstorming wherein participants are encouraged to freely express thoughts and feelings. Such exercises may reduce the inhibitions of thoughts and over-reliance on mental models. In one embodiment, participation in the cathartic exercise is done in an anonymous manner in order to further encourage open expression of ideas.

Figure 11:
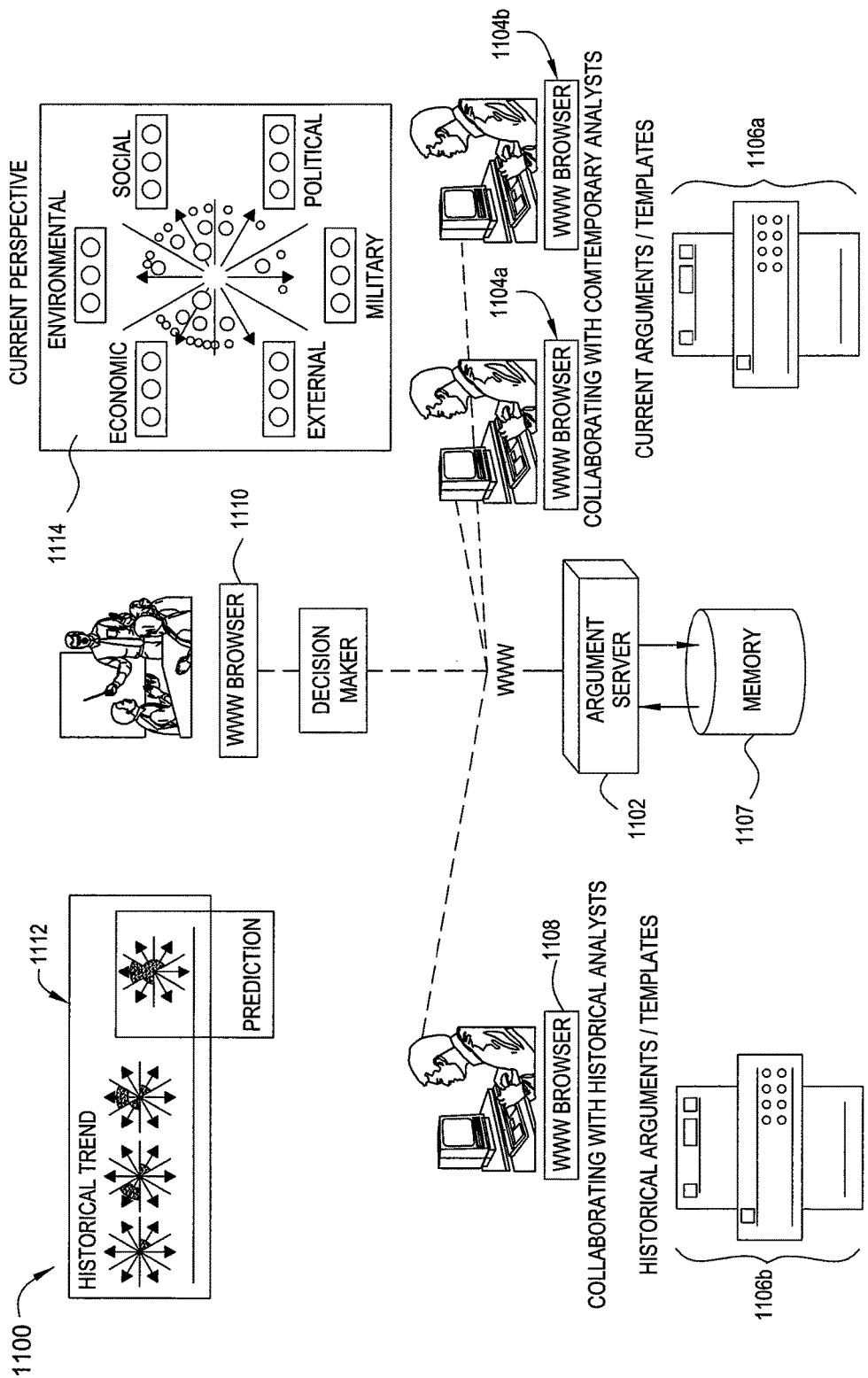
FIG. 11 is a diagrammatic representation of an analytical system implemented within a computer network in accordance with one embodiment of the present invention.

FIG. 11 is a diagrammatic representation of an analytical system 1100 implemented within a CMC tool in accordance with one embodiment of the present invention. The analytical system 1100 may be implemented, for example, in accordance with step 106 of the method 100 in order to analyze and critique ideas synthesized in a collaborative brainstorming session.

As shown, the analytical system 1100 includes an argument server 1102 and a memory unit 1107. Any suitable processing unit, such as one or more general purpose computer, may be configured to provide the capabilities (as described further below) of the argument server 1102 and memory 1107. The memory 1107 is generally used to store a plurality of templates and arguments 1106. Each template includes a plurality of questions that are relevant for reaching a conclusion regarding a particular situation.

In one embodiment, the templates are generated by decision making experts (e.g., via browser 1108 and argument server 1102) in accordance with the results of the collaborative brainstorming. A user may form an argument by selecting and instantiating a template (e.g., via browser 1104a and argument server 1102). The user may at least partially complete the instantiated argument by answering one or more questions of the instantiated argument and associating rationale statements and supporting relevant evidence with each answered question. The user may also associate exhibits with one or more questions that may be relevant to answering such question so that other collaborative users may answer the question using the associated exhibit which is then "promoted" to relevant evidence (e.g., via browser 1104b and argument server 1102). Alternatively, the user who initiates the exhibit may "promote" the exhibit to documentary evidence to support an answer to a question after analyzing the exhibit further.

Memory 1107 may contain both historical arguments/templates 1106b and current arguments/templates 1106a. The historical arguments/templates include arguments and templates that have been completed and stored within memory 1107 (also referred to as "published" arguments). The current arguments/templates include arguments and templates that are currently being generated by one or more users. In a preferred embodiment, current users collaborate within a computer network (e.g., via browsers 1104a and 1104b and argument server 1102) to form current arguments and templates 1106a. These users may also, in effect, collaborate with users from the past by accessing and using historical arguments and/or templates 1106b to form current arguments and/or templates 1106a. Alternatively, the collaborators may generate a current argument and template that is not based on a historical argument or template. That is, a new template is generated and instantiated as a current argument. After the argument or template is generated by the collaborating users, the finished arguments and templates are then stored in memory 1107 as historical arguments and templates 1106b.

Via argument server 1102, users may then access the historical and current arguments and templates 1106b for decision making purposes. For example, users may access past situations and conclusions represented in historical arguments and compare these past situations to a current situation to predict the outcome of the current situation. In the illustrated example, decision makers access historical arguments and templates 1106b via browser 1110, argument server 1102, and memory 1107. For example, the decision makers view graphical representations 1112 of the historical arguments and templates 1106b through browser 1110. These graphical representations 1112 present the generated arguments and templates in a form that facilitates decision making. In one embodiment, several historical arguments may be compiled together into a single graphical representation to evaluate a historical trend for a particular situation. Users may also review graphical representations of current arguments 1114 (that may be based on historical templates or generated from a newly created template) to aid in forming a new conclusion regarding a current situation through browser 1110, argument server 1102, and memory 1107.

Figure 12:
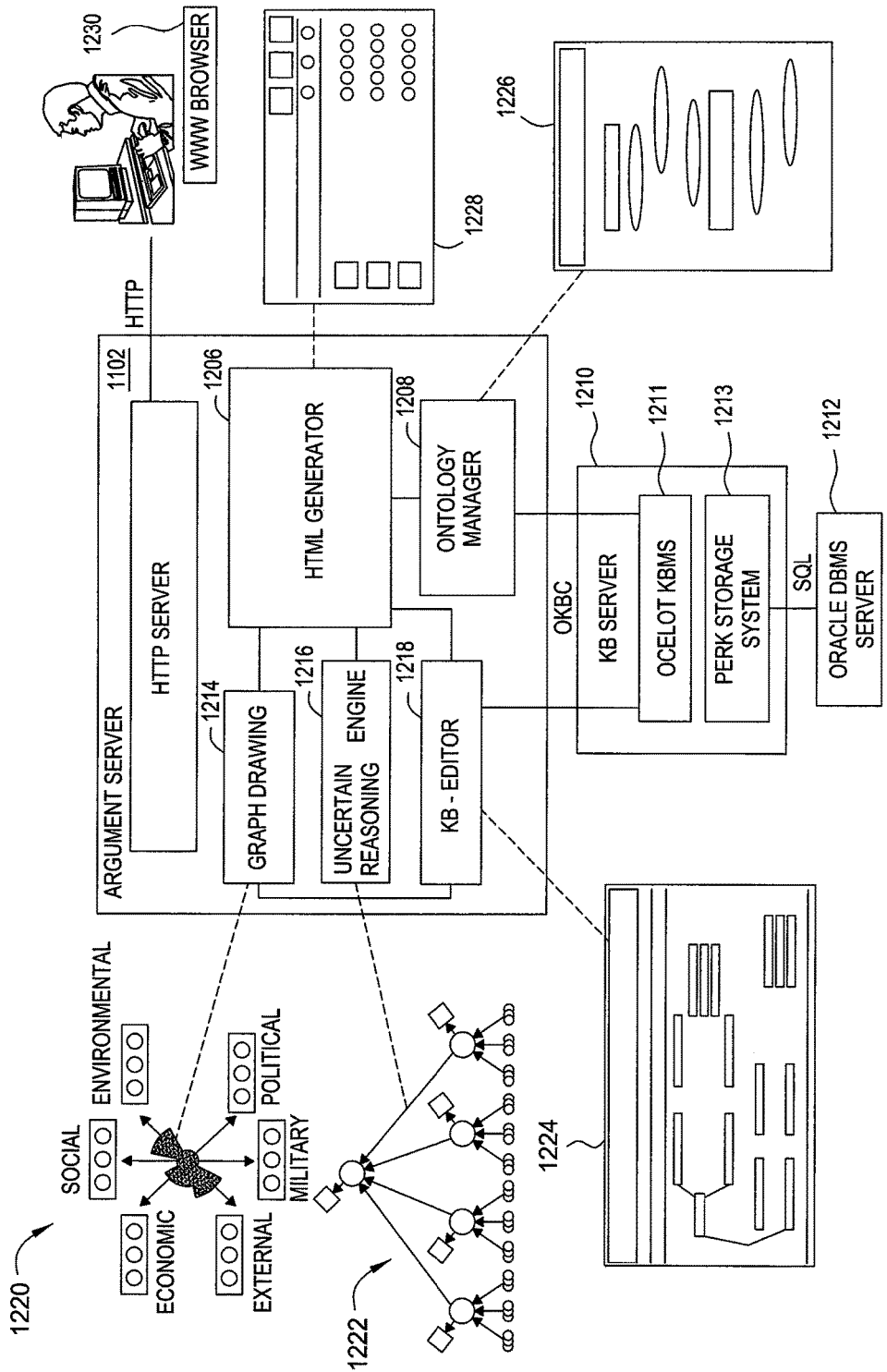
FIG. 12 is a diagrammatic representation of the argument server of FIG. 1 in accordance with one embodiment of the present invention.

The argument server 1102 may be configured with any suitable combination of software and/or hardware. FIG. 12 is a diagrammatic representation of the argument server 1102 of FIG. 11 in accordance with one embodiment of the present invention. As shown, the argument server 1102 includes HTTP server 1202, HTML generator 1206, ontology manager 1208, a graph drawing block 1214, Uncertain Reasoning engine 1216, and a knowledge base (KB) editor 1218. The argument server 1102 is also associated with knowledge base (KB) server 1210 and SQL server 1212.

Any suitable memory management scheme may be utilized for storing arguments and templates within memory 1107. In the illustrated embodiment, KB server 1210 accesses and retrieves objects from memory 1107 via SQL server 1212. Any suitable SQL server 1212 may be utilized. In one example, an Oracle data base management system (DBMS) server may be used. The KB server 1210 may have any suitable configuration. In the illustrated embodiment, the KB server 1210 is formed from an Ocelot knowledge base management system (KBMS) 1211 and a Perk storage system 1213. The KBMS 1211 is generally configured to change slot values and KB frames that represent question answers that are to be stored in memory 1107, as well as performing calls to memory 1107. The Perk storage system 1213 moves KB frames to and from temporary memory to and from database memory 1107, as well as handling calls to database memory 1107. The Oracle DBMS 1212 retrieves and updates the database 1107 to reflect changes in a knowledge base frame. Alternatively, the database 1107 may simply be managed by a single SQL server 1212.

The ontology manager 1208 generally updates answers to questions within templates located in memory 1107, as well as calling objects (e.g., templates and arguments) from memory 1107 via KB Server 1210 and SQL server 1212. The HTML generator 1206 interprets a command from the user for changing an answer to an argument question, as well as calling objects from memory 1107 via ontology manager 1208, KB Server 1210 and SQL server 1212. The HTTP server 1202 responds to a user's request regarding a web page by querying the HTML generator 1206 for such page and then sending the page to the user.

The graph drawing block 1214 generally provides graphical representations of templates and arguments. The Uncertain Reasoning engine 1216 generally provides mechanisms for propagating probabilities of answers to a hierarchical set of questions, as explained further below. The KB editor 1218 generally provides mechanisms for editing elements within the KB database. Of course, one or more of the functional blocks associated with the server 1102 may be combined or arranged in any suitable combination and number of functional blocks.

Figure 13:
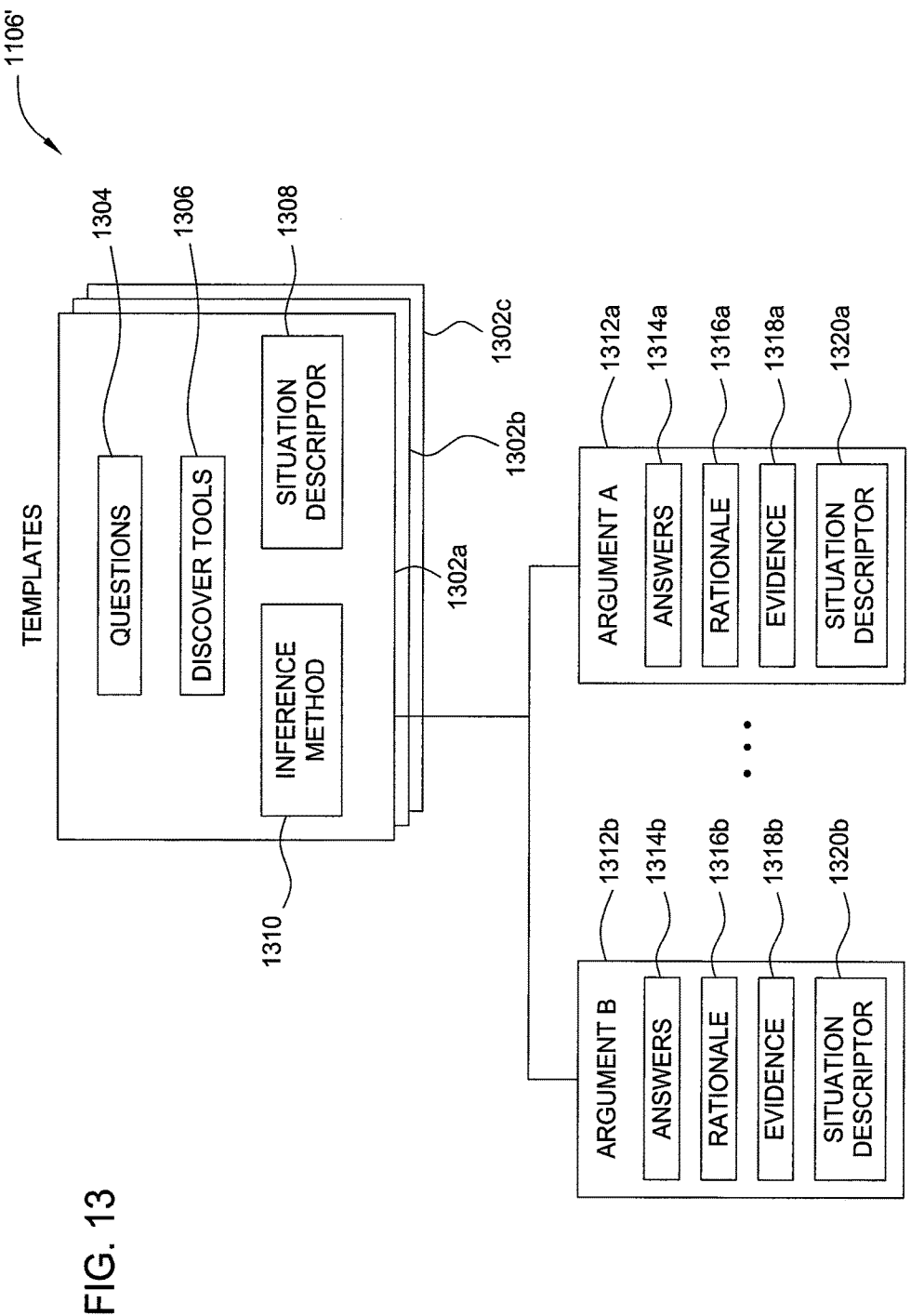
FIG. 13 is a diagrammatic representation of a set of templates and arguments in accordance with one implementation of the present invention.

FIG. 13 is a diagrammatic representation of a set of templates and arguments 1106' in accordance with one implementation of the present invention. As shown, each template 1302 includes a plurality of questions 1304, discovery tools 1306, an inference method 1310, and a situation descriptor 1308. In a preferred embodiment, the questions are arranged hierarchically for facilitating determination of a particular conclusion.

Figure 14:
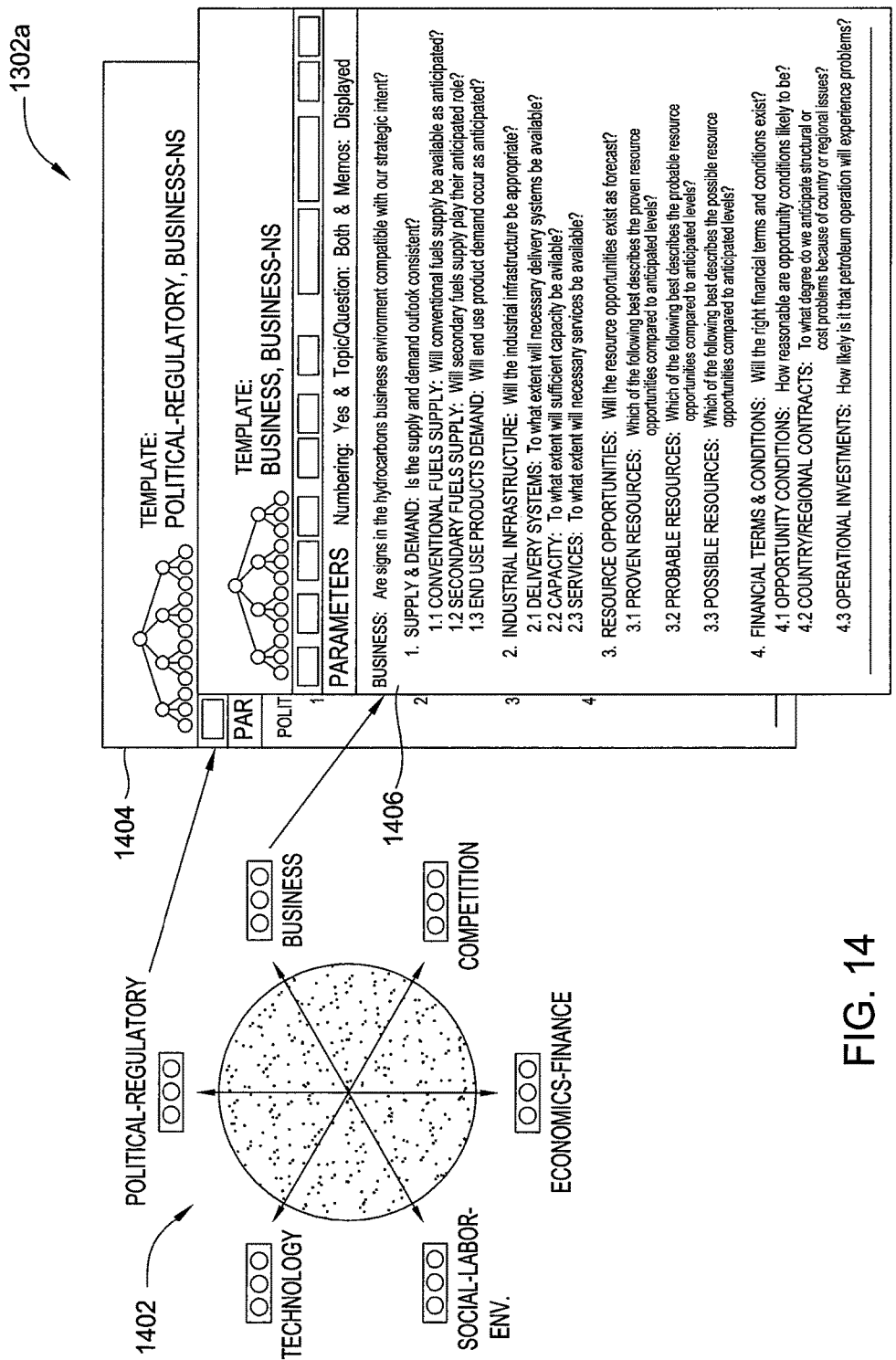
FIG. 14 illustrates particular details of a template in accordance with one embodiment of the present invention.

FIG. 14 illustrates particular details of template 1302a of FIG. 13. Template 1302a includes a number of categories of questions 1402 for reaching a conclusion for a typical business type situation. The illustrated business situation and main question is "whether a hydrocarbon type business is likely to become unstable." Each category 1402 may have an associated hierarchy of questions. An expanded view is shown for categories 1404 and 1406. As shown, there is a hierarchy of questions for a "political and regulatory" category 1404 and for a "business" category 1406. The main question is determined by all of these hierarchy of questions for each category 1406. More specifically, the business category 1406 includes a hierarchy of questions for answering the business category question "are there signs in the hydrocarbons business environment that are compatible with our strategic intent?" To answer this business category question, four lower level questions are to be answered. The four questions include:

1. Is the supply and demand outlook consistent?
2. Will the industrial infrastructure be appropriate?
3. Will the resource opportunities exist as forecast?
4. Will the right financial terms and conditions exist?

These four "children" questions each have three lower level questions. When the lowest level children questions are answered, the children answers may determine the answers for the higher level parent question. For example questions 4.1, 4.2, and 4.3 are answered to form the answers for question 4. Likewise, questions 3.1, 3.2, and 3.3 are answered to form the answer for question 3. Questions 2.1, 2.2, and 2.3 are answered to form the answer for question 2, and questions 1.1, 1.2, and 1.3 are answered to form the answer for question 1. The answers for questions 1 through 4 form the answer to the highest question for the business category 1406 (are there signs in the hydrocarbons business environment that are compatible with our strategic intent?). Although the illustrated template 1302a is shown as having multiple categories 1402, a template may have only a single category, e.g., uni-dimensional.

Referring back to FIG. 13, each template 1302 may include one or more discovery tools 1306. A discovery tool generally provides mechanisms to aid in answering a question. By way of examples, the discovery tool may include a query to a search engine, a query to a database, a link to a web page, a reference to a cascaded template, or a call to any web accessible tool.

Each template 1302 may also include one or more inference methods 1301 for determining how to propagate answers from children questions up to their parent questions, which inference methods are explained further below. Each template also includes a situation descriptor 308 that describes the type of situations for which the template is intended to be used. The memory 1107 may also contain an index for a plurality of situation descriptors. This index may be searched (e.g., via server 1102) for situation descriptors that closely match a current situation to obtain possibly relevant templates for a current situation. The most relevant template may then be used to form a new or current argument for the current situation.

When a current argument is filled with answers to the associated template questions, the current argument may be saved as a historical argument. For example, the associated template is applied to the current situation. The associated template may also be applied to other situations to form other arguments having possibly varying conclusions. In other words, each new situation results in a new argument with a corresponding conclusion. Accordingly, each template may be associated with one or more arguments 1312 as shown if FIG. 13.

As shown, each argument includes a plurality of answers 1314, one or more rationale 1316 associated with each answer, one or more pieces of relevant evidence 1318 associated with each answer, and a situation descriptor 1320. A rationale 1316 generally specifies why a particular answer is given. The documentary evidence 1318 also generally supports each answer by presenting one or more sources for the particular answer. That is, the relevance of a piece of evidence to the subject matter of an argument has been established and recorded. However, the evidence does not have to be documentary. In other words, the evidence may include anything that is helpful in forming a conclusion or judgment, as well as any species of proof presented for the purpose of inducing beliefs in a contention for a particular answer to a question. A situation descriptor 1320 generally describes what an argument is about. For example, the situation descriptor describes the actors, the types of event under discussion, where or when the discussion occurs, and the perspective from which the situation is being analyzed.

Figure 15:
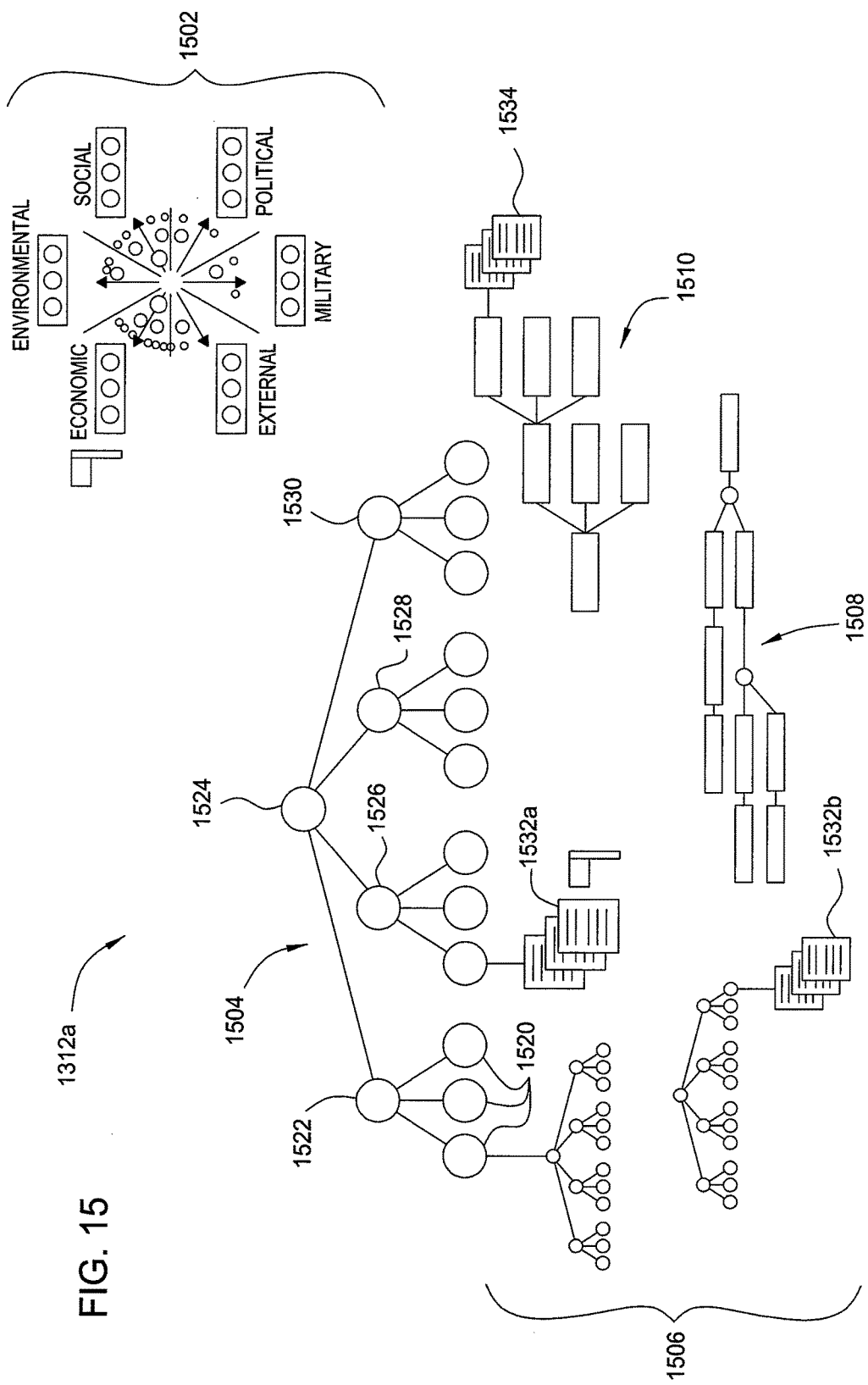
FIG. 15 illustrates a multi-dimensional argument in accordance with one embodiment of the present invention.

FIG. 15 illustrates a multi-dimensional argument 1312a in accordance with one embodiment of the present invention. The argument 1312a includes a plurality of categories 1502 which each contain questions that have been answered to form a particular conclusion regarding a particular situation. Each category has a hierarchy of questions 1504 (shown only for the economic category) which are answered to form a conclusion regarding the particular category.

As shown, each answer is represented by a different color or shade which in turn represents a different level of risk or opportunity for a particular question. In the illustrated embodiment, the colors are green, yellow-green, yellow, orange, and red. Green represents a highly likely positive outcome; red represents a highly likely negative outcome; yellow-green indicates a likely positive outcome; orange indicates a likely negative outcome; and yellow indicates an about as likely as not negative or positive outcome. This type of color scheme overlaid onto the tree structure (e.g., tree structure 1504 for the economic category) provides an easy to understand mechanism for efficiently conveying the reasoning for the final argument conclusion. Several color schemes are described further below.

Additionally, the answers for children questions may be propagated up to a parent question. That is, the answer for question 1524 is formed from the answers 1522, 1526, 1528 and 1530. Likewise, the answer for question 1522 is formed from answers 1520. One of the answers 1520 is formed from the answers of a cascaded argument 1506.

One or more of the answers may include documentary evidence, e.g., 1532a and 1532b. Other answers may include other types of supporting evidence. For example, an answer may be supported with a critical path analysis 1508 or a query structure 1510. One or more of these supporting evidence structures may also include documentary evidence, e.g., 1534.

Figure 16:
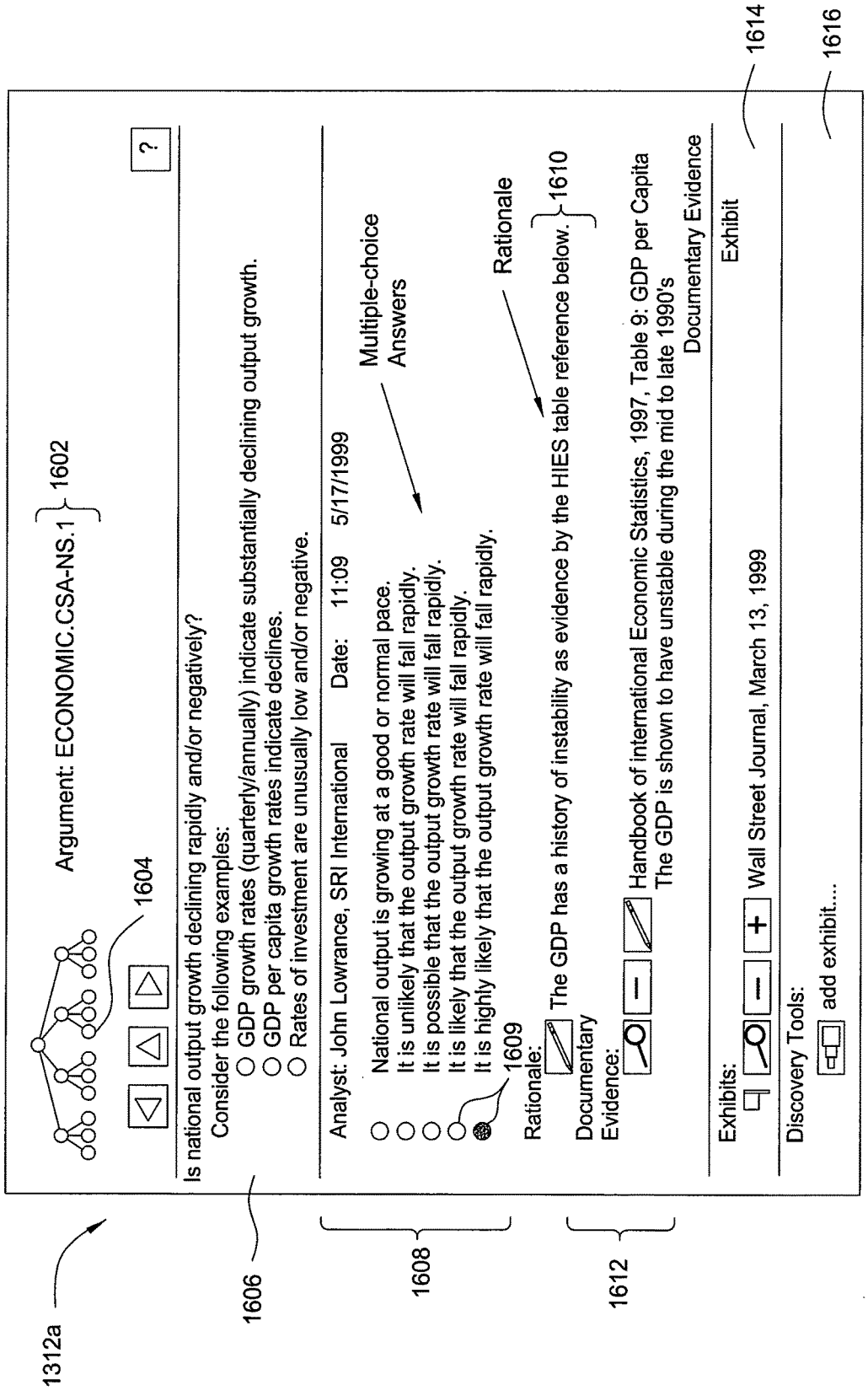
FIG. 16 is a diagrammatic representation of a portion of the argument of FIG. 5 in accordance with one embodiment of the present invention.

FIG. 16 is a diagrammatic representation of a portion of the argument 1312a of FIG. 15 in accordance with one embodiment of the present invention. As shown, the argument includes a tree graphic 1602 for a hierarchically arranged set of answers. The different answers 1602 are each represented by different colors or shades of gray. Any of the answers may be expanded by selected a node within the tree graphic 1602. Specifically, the details of answer 1604 are expanded below the tree graphic 1602. In the illustrated embodiment, the presented question for answer 604 is "Is national output growth declining rapidly and/or negative?" Amplification 1606 may also be presented for such question 1604. The amplification is part of the initial template upon which this argument is based. Amplification may include any suitable information which the user may consider to answer the question. As shown, a plurality of examples is listed as amplification. Specifically, a user is instructed to consider that:

GDP growth rates indicate substantially declining output growth, GDP per capita growth rates indicate declines, and Rates of investment are unusually low and/or negative.

For each question, a list of multiple choice answers 1608 is also presented. The user may select one or more of these answers. As shown, the user has selected two answers for answer 1604. Preferably, each answer reflects a level of risk or opportunity. That is, each answer indicates a likelihood of a negative or positive outcome for the associated question. Said in another way, each multiple choice question has a categorical scale of likelihood represented by a number of answers. In one embodiment, there may be three answers: highly likely, about as likely as not, and highly unlikely. In the illustrated embodiment, the expanded question has five answers: highly likely, likely, about as likely as not, unlikely, and highly unlikely. In our example, each answer pertains to the likelihood that national output growth will decline. Accordingly, the user may select one or more levels of likelihood that the national output is declining:

National output is growing at a good or normal pace.
It is unlikely that the output growth rate will fall rapidly.
It is possible that the output growth rate will fall rapidly.
It is likely that the output growth rate will fall rapidly.
It is highly likely that the output growth rate will fall rapidly.

After the user selects one or more answers 1608, the user may associate one or more rationale for choosing such answers. The rationale generally includes the user's or users' reasons for selecting his or her answers to the associated question. The user may also associate documentary evidence 1612 that support his or her answers to the associated question.

The presented question 1604 may also include exhibits 1614 or discovery tools 1616 that may be utilized to answer the associated question. The exhibits 1614 are generally documents that are potentially relevant to answering the question. As described above, the discovery tools 1616 may include parameterized queries or tools that may be launched to display information or produces results that are relevant to the particular question. An exhibit may be associated with a particular argument question until someone accepts or denies the exhibit's relevance to answering the particular question. This is particular useful in a collaborative environment where a first user is unsure as to how to answer a particular question but thinks that a particular exhibit may be relevant towards answering such question. A second user (or the same first user) may later review the exhibit and verify its relevance, answer the question based at least in part on the exhibit, and mark the exhibit as documentary evidence.

Figure 17A:
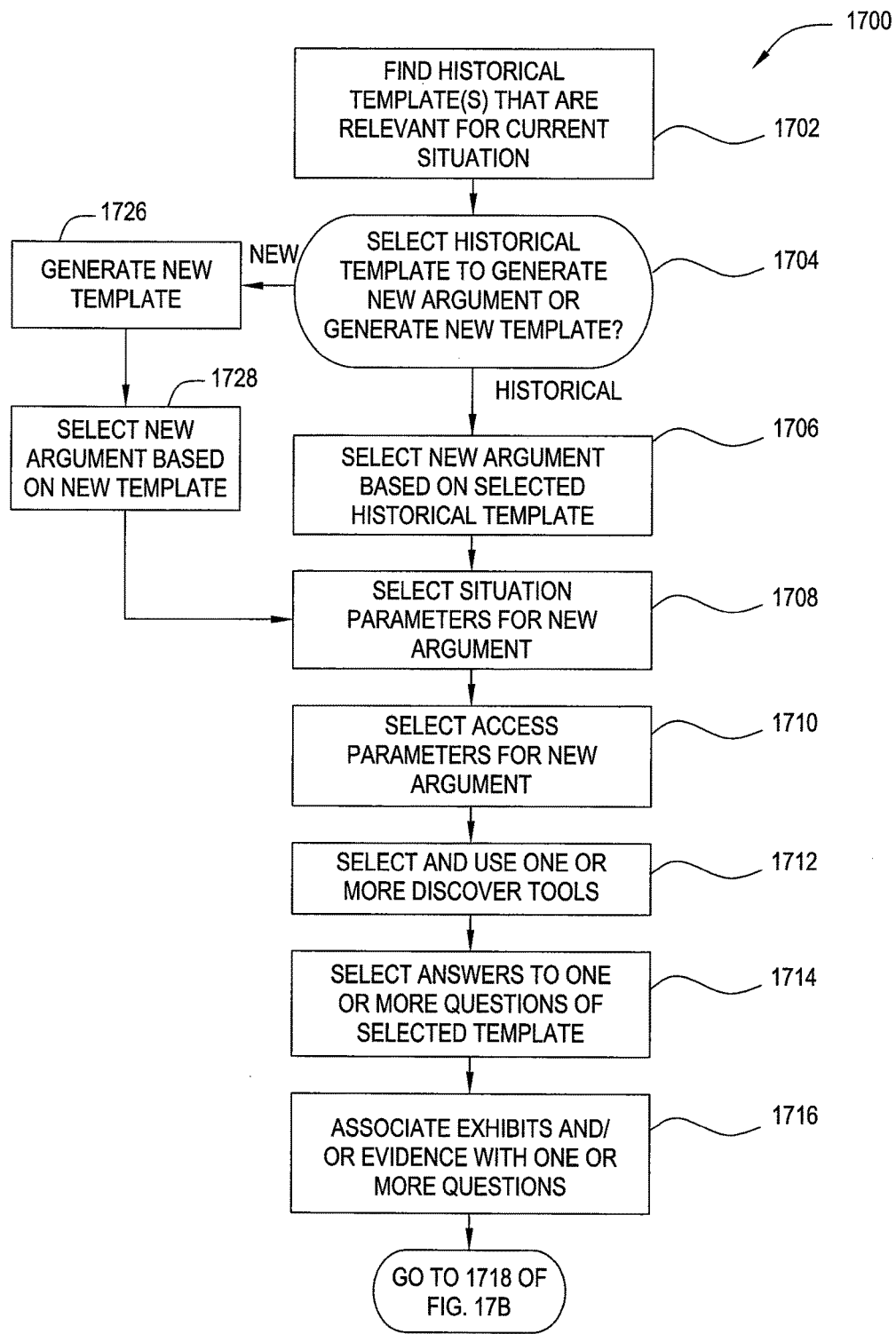
FIGS. 17A and 17B are flowcharts illustrating the procedure for generating an argument in accordance with one embodiment of the present invention.
Figure 17B:
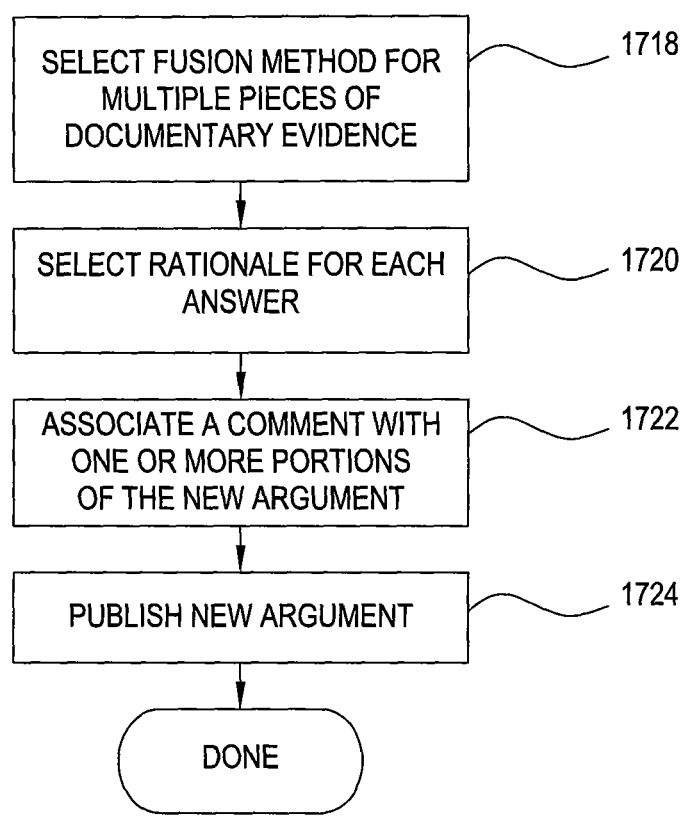

FIGS. 17A and 17B are flowcharts illustrating the procedure 1700 for generating an argument in accordance with one embodiment of the present invention. Initially, historical templates are found that are relevant to a particular current situation in operation 1702. Alternatively, a template is newly generated in response to the results of a collaborative brainstorming process, as described in FIGS. 2-10. It is then determined whether a historical template is to be selected to generate a new argument or a new template is to be generated in operation 1704. Operation 1702 may be skipped and a new template generated for the situation (e.g., operation 1726).

Figure 18:
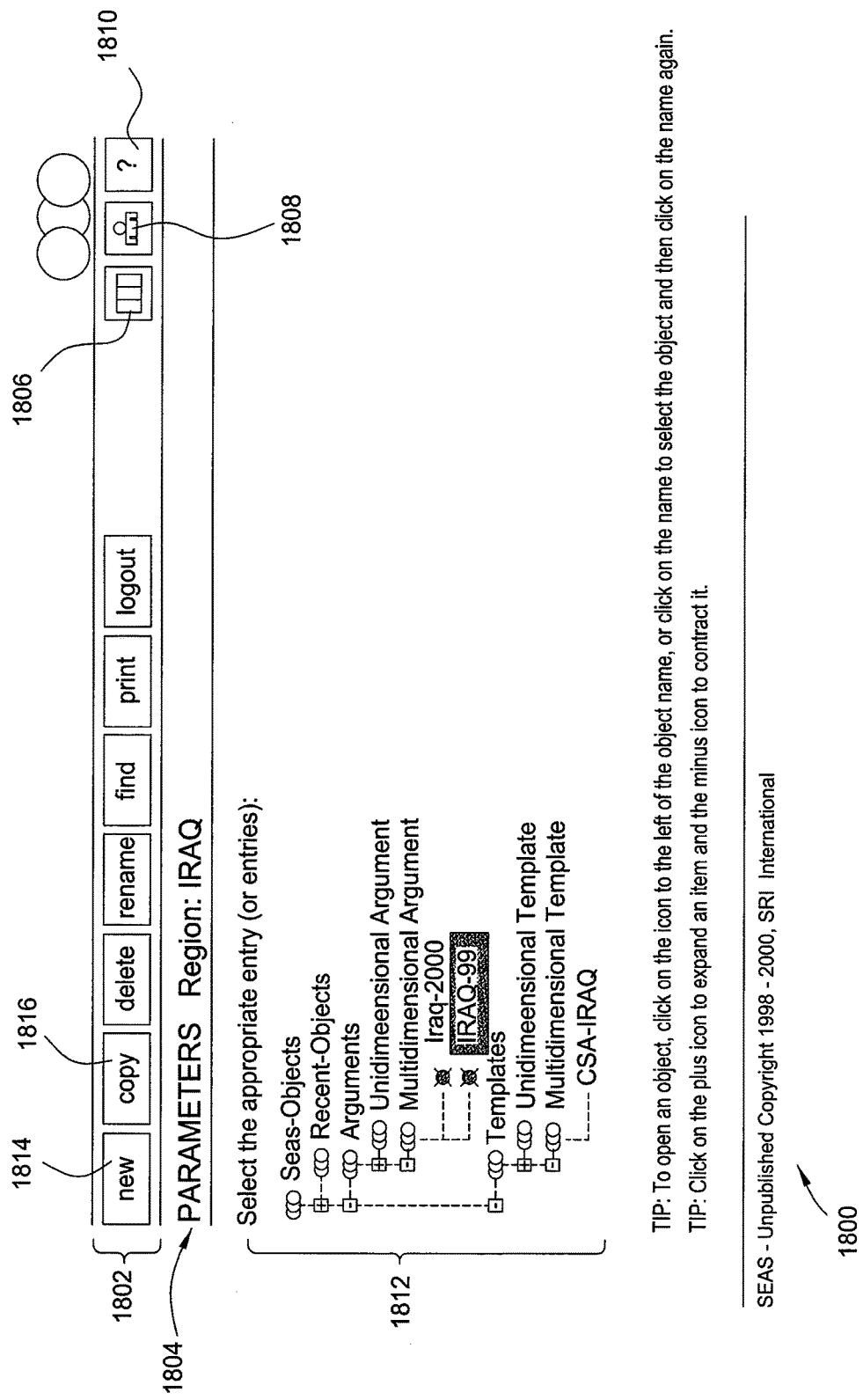
FIG. 18 is a screen shot of an object manager interface in accordance with one embodiment of the present invention.

Any suitable interface may be utilized for facilitating generation of new objects (e.g., arguments and templates) and retrieval of historical or previously generated objects. FIG. 18 is a screen shot of an object manager interface 1800 in accordance with one embodiment of the present invention. The object manager 1800 is generally responsible for the creation, copying, deleting, retrieval, and opening of arguments and templates. As shown, the object manager 1800 is presenting a number of objects in display 1812. As shown, there is a button in the toolbar 1802 for each of these operations. Additionally, the toolbar 1802 includes a print button that prints this current window and a logout button that dismisses the current window and ends the user's session with the argument server 1102. On the right of the tool bar 1802, a Manager Viewer Parameters Editor button 1806 invokes that editor, a Personal Information button 1808 invokes a User Information Editor, and a Help button 1810 invokes a Help system.

Figure 19:
FIG. 19 is an example of a parameter display for entering parameters for retrieving objects.

Objects in this display 1812 are retrieved according to search parameters. The current parameter settings 1804 are summarized immediately below the toolbar 1802. Pushing the Manager Viewer Parameters editor button 1806 brings up a parameter display where these setting can be modified. FIG. 19 is an example of a parameter display 1900 for entering parameters for retrieving objects. The user can either directly type in the desired criteria or use the discovery buttons (e.g., 1902a and 1902b) adjacent to some of these fields to hierarchically browse and select the desired option. Once the user has entered the desired criteria, pushing the OK button 1904 will cause objects matching that criteria and accessible to the user (see Publishing description below) to be retrieved and displayed in the Manager window 1812; pushing the cancel button 1906 will return to the Manager 1900 without affecting its content.

Thus, a user may search for and retrieve historical templates that are relevant to the current situation through Manager 1900. Referring back to FIG. 18, retrieved objects 1812 (matching the parameter settings summarized immediately below the toolbar 1802) are listed hierarchically in the lower portion of this display. Items that have others items below them in the hierarchy that are not currently visible, have a + button adjacent to them. Clicking on the + button will reveal the items that are immediately below this item in the hierarchy and will change the + to a − button. Clicking on a − button causes the item displayed below the associated items to be hidden and causes the − button to be replaced with a + button. When the cursor is positioned over objects representing arguments or templates, the associated situation descriptor and publication information is displayed in a pop-up. Thus, using these buttons, the hierarchy of currently retrieved objects can be incrementally browsed and explored to determine the relevance of particular arguments and templates to the current situation.

By clicking on the icon adjacent to a retrieved historical argument or template, the argument or template may be opened in a Hierarchical Viewer/Editor window (not shown) so the user may assess its relevance. If a retrieved historical template is to be used, a new argument is then instantiated or selected based on the selected historical template in operation 1706. Once a relevant historical template is found, the user may select the new button 1814 in the toolbar 1802 to create a new argument based on the relevant template. Alternatively, one may select the copy button 816 for a currently retrieved relevant argument to create a copy of the retrieved argument that may be changed and formed into a new argument.

After a new argument is selected, situation parameters may then be selected for the new argument in operation 1708. FIG. 20 is an example of a situation descriptor viewer/editor 2000 for managing the situation descriptors that are associated with a particular argument and template. Here the situation descriptor viewer/editor 1000 depicts the situation descriptor associated with a multidimensional argument (i.e., IRAQ-99).

In general terms, a situation descriptor describes what an argument or template is about: who is the actor under discussion, what sort of event is under discussion, where (i.e., region) or when the situation occurs (i.e., time interval), and the perspective from which the situation is being analyzed. In the case of a template, the descriptor indicates how a template is intended to be used: for situations in a certain region of the world, or to analyze a particular type of actor, or a particular type of event. In the case of an argument, the descriptor indicates what an argument is about: the actor analyzed, the precise event, where or when the situation under analysis occurred.

Some of the situation descriptor slots (e.g., slots are used with a knowledge base database) may only be filled by selections from a predefined set of terms (e.g., those preceded by a discovery button) while others may be filled with free-form text (e.g., those not preceded by a discovery button). The fixed slots are the primary basis for retrieval: they constitute the equivalent of a library "card catalog" for indexing and retrieving arguments and templates. While the fixed slots might only approximate the true nature of the situation, the free-form slots provide a means to more precisely describe the situation. Using the object manager 1900, the fixed slots are first exploited to retrieve potentially relevant arguments and templates, then the free-form slots are examined by the user to make the final determination of relevance.

Figure 21:
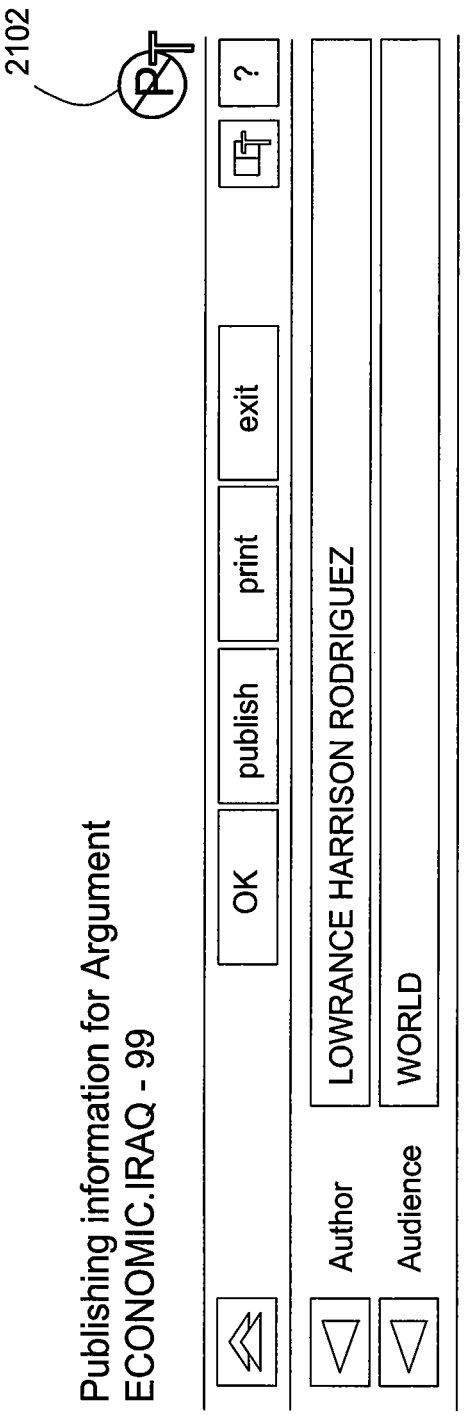
FIG. 21 depicts an access window for displaying and/or modifying the publication information for an unpublished uni-dimensional argument.

Access parameters for the new argument may also be selected in operation 1710. Access parameters generally specify who may view and/or edit the new argument. FIG. 21 depicts an access window 2100 for displaying and/or modifying the publication information for an unpublished uni-dimensional argument (i.e., ECONOMIC.IRAQ-99). The Unpublished Template symbol 2102 indicates that neither this argument nor the argument's underlying template is published; the absence of a "READ ONLY" symbol indicates that the current user can modify this argument.

One or more discovery tools may be selected and used in operation 1712. FIG. 16 shows discovery tools 1616 being associated with question 1606. Answers to one or more questions of the selected template may then be selected in operation 1714. FIG. 16 illustrates answers 1608 that are presented for question 1606. In this illustration, the user has selected two answers by clicking on two selection buttons 1609. Exhibits or documentary evidence may also be associated with one or more questions in operation 1714. Additionally, previous exhibits may be promoted to evidence. FIG. 16 illustrates documentary evidence 1612 and exhibits 1614 associated with question 606.

Each question may have more than one piece of supporting evidence. FIG. 22 illustrates a question having two pieces of associated documentary evidence 2202. Each piece of evidence may result in a different answer for the associated question. As shown, each piece of answer has a different set of answers selected.

A fusion method 2204 may also be selected for multiple pieces of evidence in operation 1718. The default fusion method is a manual fusion method, where the user must select the answer based on the supporting pieces of evidence. The fusion method is similar to the above described inference method associated with questions. Both the fusion and inference methods determine how answers are combined into a single answer. The fusion method determine how the separate answers formed for each piece of evidence are combined into a single answer to a particular question, while the inference method determines how children answers are combined to form an answer for a higher level parent question. In both methods, the answers may be averaged together, a minimum answer may be selected (most negative outcome) or a maximum answer may be selected (most positive outcome). As shown, the maximum fusion method is selected In the above described red-green color scheme, the answer having the most red shaded lights is used for the final answer in the maximum method and the answer having the most green shaded lights is used for the final answer in the minimum method.

Figure 23:
FIG. 23 illustrates a new memo editor in accordance with one embodiment of the present invention.

One or more rationales may be selected for each answer in operation 1720. FIG. 16 illustrates rationale 1610 associated with question 1606. A comment may also be associated with one or more portions of the new argument in operation 1722. One or more users may be selected as having access privileges with respect to a particular comment. On one embodiment, memos are created by filling out all of the fields in the new memo editor 2300 as illustrated in FIG. 23.

The memo Type indicates the purpose of the memo. Memos can be used for any suitable purpose. In the illustrated examples, memos may be used to leave instructions for others on how to use argument/templates, to critique an argument/template, to record overriding assumptions, to attach a summary, to state the context within which this argument/template was/should be used, to indicate what is left to do, or to attach a miscellaneous comment.

The Author and Audience are similar to the author and audience of arguments and templates: authors can modify the memo while members of the audience can view but not modify the memo. These fields can be directly filled out by typing or indirectly with the aid of a browser, invoked by pushing the adjacent discovery buttons. The Subject tells the reader what the memo is about and the Text provides the details. Preferably, the memos are only seen when the object to which they are attached is viewed by members of the Audience or Authors.

When the new argument is complete, the finished argument may then be published in operation 1724. Preferably, after an argument is published, it cannot be altered. When alteration is prohibited, users may then rely on a published argument as being stable. If updates for a particular situation and published are desired, a new updated argument may be generated for the particular situation. The new updated argument may reach a different conclusion than the previous argument.

If a historical template is not going to be used, a new template may be generated in operation 1726. A new argument may then be selected based on the new template in operation 1728. The user may then complete portions of the argument in operations 1708-1722. The completed argument may then be published in operation 1724.

Figure 24:
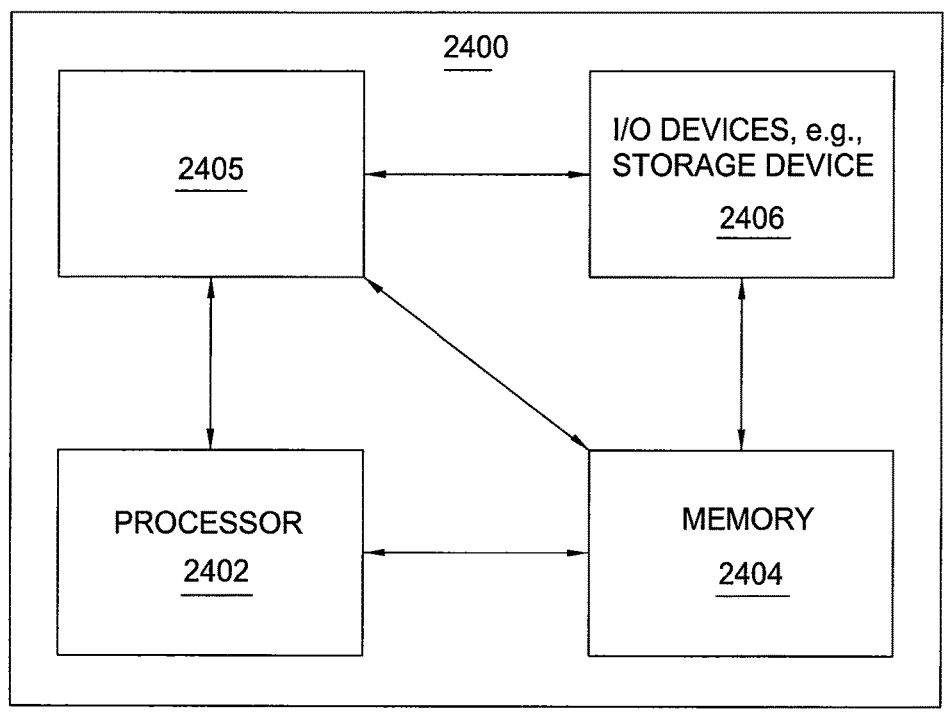
FIG. 24 is a high level block diagram of the present method for facilitating computer-supported collaborative work sessions that is implemented using a general purpose computing device.

FIG. 24 is a high level block diagram of the present method for computer-mediated collaborative reasoning and analysis that is implemented using a general purpose computing device 2400. In one embodiment, a general purpose computing device 2400 comprises a processor 2402, a memory 2404, a collaborative work module 2405 and various input/output (I/O) devices 2406 such as a display, a keyboard, a mouse, a modem, and the like. In one embodiment, at least one I/O device is a storage device (e.g., a disk drive, an optical disk drive, a floppy disk drive). It should be understood that the collaborative work module 2405 can be implemented as a physical device or subsystem that is coupled to a processor through a communication channel.

Alternatively, the collaborative work module 2405 can be represented by one or more software applications (or even a combination of software and hardware, e.g., using Application Specific Integrated Circuits (ASIC)), where the software is loaded from a storage medium (e.g., I/O devices 2406) and operated by the processor 2402 in the memory 2404 of the general purpose computing device 2400. Thus, in one embodiment, the collaborative work module 2405 for facilitating a collaborative work session described herein with reference to the preceding Figures can be stored on a computer readable medium or carrier (e.g., RAM, magnetic or optical drive or diskette, and the like).

Thus, the present invention represents a significant advancement in the field of intelligence analysis. Thus, the present invention exploits collaboration to reduce bias while supporting diversity of thought. Scenarios and significant themes resulting from group brainstorming sessions are used to form the structure of argument templates. Arguments formed from these templates may then, in turn, motivate further topics to be examined by the group in a subsequent brainstorming session.

Although various embodiments which incorporate the teachings of the present invention have been shown and described in detail herein, those skilled in the art can readily devise many other varied embodiments that still incorporate these teachings.

What is claimed is:

1. A computer-implemented method for synthesizing and analyzing user input in a collaborative work session, the method comprising:
   monitoring a plurality of inputs submitted by a group of users in the collaborative work session, wherein at least some of the plurality of inputs include natural language content;
   algorithmically analyzing the natural language content in real time in order to parse a plurality of ideas from the plurality of inputs;
   algorithmically identifying similarities among the plurality of ideas;
   clustering the plurality of ideas into a set of clusters based on the similarities; and
   presenting the clusters to the group of users during the collaborative work session,
   wherein the algorithmically analyzing, the algorithmically identifying, and the clustering are each performed at least in part using a processor, and
   wherein at least one user of the group of users is a synthetic participant that is independent from a moderator for the collaborative work session.

2. The computer-implemented method of claim 1, wherein the synthetic participant simulates an expert in a given field.

3. The computer-implemented method of claim 1, wherein the algorithmically analyzing and the algorithmically identifying are performed by the moderator who is a synthetic, non-human moderator.

4. The computer-implemented method of claim 1, wherein the algorithmically analyzing is performed using natural language processing techniques.

5. The computer-implemented method of claim 4, wherein the natural language processing techniques include generating canonical representations of the plurality of ideas.

6. The computer-implemented method of claim 5, wherein canonical representations comprise trees of words mapped to a lexical system.

7. The computer-implemented method of claim 1, wherein the algorithmically identifying is performed using pattern recognition techniques.

8. The computer-implemented method of claim 7, wherein the pattern recognition techniques identify similarities between a current collaborative work session and a previous, stored collaborative work session.

9. The computer-implemented method of claim 8, wherein the similarities are quantified using a graph edit distance.

10. The computer-implemented method of claim 1, wherein the clustering comprises:
    filtering those of the plurality of ideas that are duplicative.

11. The computer-implemented method of claim 1, wherein the algorithmically identifying comprises:
    assessing a thematic closeness of a subset of the plurality of ideas.

12. The computer-implemented method of claim 1, wherein the clustering is performed in part with assistance from the group of users.

13. The computer-implemented method of claim 12, further comprising:
    forwarding the plurality of inputs to the group of users;
    receiving initial clusters of the plurality of inputs from the group of users; and
    incorporating at least a portion of at least one of the initial clusters of the plurality of inputs into the set of clusters.

14. The computer-implemented method of claim 1, wherein the algorithmically analyzing comprises:
  algorithmically identifying a known bias in the natural language content.

15. The computer-implemented method of claim 1, further comprising:
  automatically formulating a question that is relevant to the natural language content; and posing the question to the group of users.

16. A computer readable storage device containing an executable program for synthesizing and analyzing user input in a collaborative work session, where the program performs steps of:
  monitoring a plurality of inputs submitted by a group of users in the collaborative work session, wherein at least some of the plurality of inputs include natural language content;
  algorithmically analyzing the natural language content in real time in order to parse a plurality of ideas from the plurality of inputs;
  algorithmically identifying similarities among the plurality of ideas;
  clustering the plurality of ideas into a set of clusters based on the similarities; and
  presenting the set of clusters to the group of users during the collaborative work session,
  wherein at least one user of the group of users is a synthetic participant that is independent from a moderator for the collaborative work session.

17. The computer readable storage device of claim 16, wherein the synthetic participant simulates an expert in a given field.

18. An apparatus for synthesizing and analyzing user input in a collaborative work session, the apparatus comprising:
  means for monitoring a plurality of inputs submitted by a group of users in the collaborative work session, wherein at least some of the plurality of inputs include natural language content;
  means for algorithmically analyzing the natural language content in real time in order to parse a plurality of ideas from the plurality of inputs;
  means for algorithmically identifying similarities among the plurality of ideas;
  means for clustering the plurality of ideas into a set of clusters based on the similarities; and
  means for presenting the set of clusters to the group of users during the collaborative work session,
  wherein at least one user of the group of users is a synthetic participant that is independent from a collaborative work session moderator.

\* \* \* \* \*